United States Patent
Akimaru et al.

(10) Patent No.: US 6,834,393 B2
(45) Date of Patent: Dec. 21, 2004

(54) DISK DEVICE

(75) Inventors: Kenji Akimaru, Osaka (JP); Teruyuki Takizawa, Osaka (JP); Yoshito Sazi, Hyogo (JP); Yoshihiro Ikawa, Osaka (JP); Masahiro Inata, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 158 days.

(21) Appl. No.: 10/220,868

(22) PCT Filed: Feb. 27, 2001

(86) PCT No.: PCT/JP01/01473
§ 371 (c)(1),
(2), (4) Date: Sep. 3, 2002

(87) PCT Pub. No.: WO01/65560
PCT Pub. Date: Sep. 7, 2001

(65) Prior Publication Data
US 2003/0035362 A1 Feb. 20, 2003

(30) Foreign Application Priority Data
Mar. 1, 2000 (JP) .......................................... 2000-055274
Apr. 17, 2000 (JP) .......................................... 2000-114801

(51) Int. Cl.[7] .......................... G11B 17/028; G11B 23/00
(52) U.S. Cl. ..................................... 720/698; 369/263.1
(58) Field of Search ....................... 720/698; 369/263.1, 369/263, 247, 270, 271, 264; 360/97.01, 99.04, 99.08, 99.12

(56) References Cited

U.S. PATENT DOCUMENTS

| 5,768,249 A | * | 6/1998 | Ro et al. ..................... 369/263 |
| 6,045,113 A | | 4/2000 | Itakura |
| 6,381,091 B1 | * | 4/2002 | Takizawa et al. ......... 360/97.01 |
| 6,643,250 B1 | * | 11/2003 | Nakamichi ................... 369/263 |
| 6,711,116 B2 | * | 3/2004 | Masaki et al. .............. 369/263 |

FOREIGN PATENT DOCUMENTS

| JP | 60-182086 | | 9/1985 |
| JP | 404017184 A | * | 1/1992 |
| JP | 10-083622 | | 3/1998 |
| JP | 11-306747 | | 11/1999 |
| JP | 11-328944 | | 11/1999 |

\* cited by examiner

*Primary Examiner*—Allen Cao
(74) *Attorney, Agent, or Firm*—Akin, Gump, Strauss, Hauer & Feld, LLP

(57) ABSTRACT

A disk drive including a motor that rotates a disk, an auto-balancer connected to a rotating portion of the motor, a base secured to the motor and connected to an external member via a first elastic member, and a dynamic vibration absorber connected to the base via a second elastic member. When the disk makes a whirling motion while being rotated by the motor, a phase angle of 120 degrees to 180 degrees is formed between a direction that is pointed from a whirling center axis toward a center of mass of the disk and a direction that is pointed from the whirling center axis toward the center of mass of the auto-balancer.

23 Claims, 15 Drawing Sheets

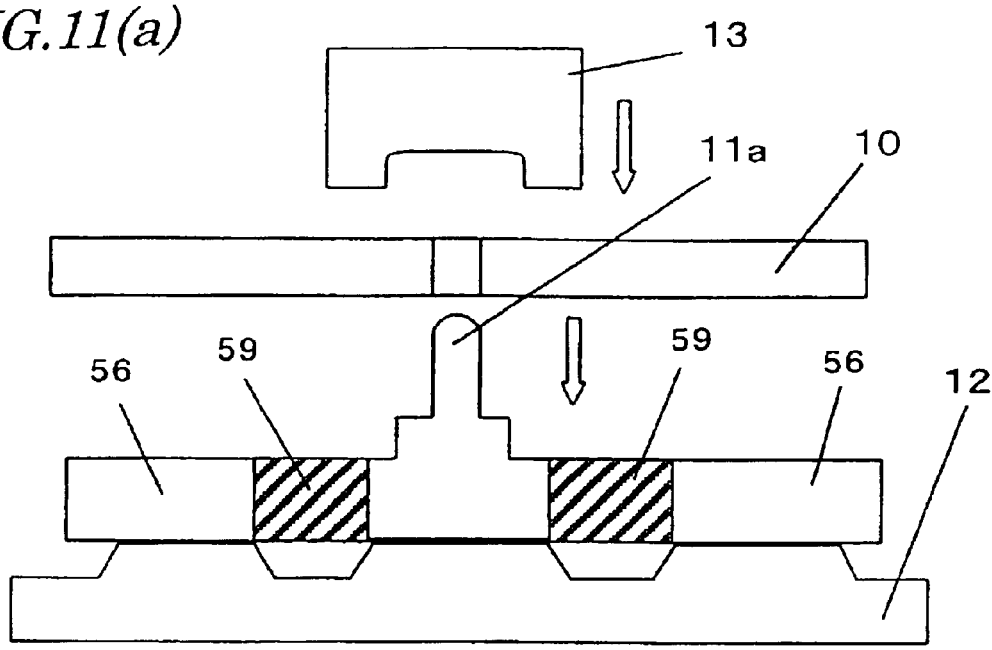
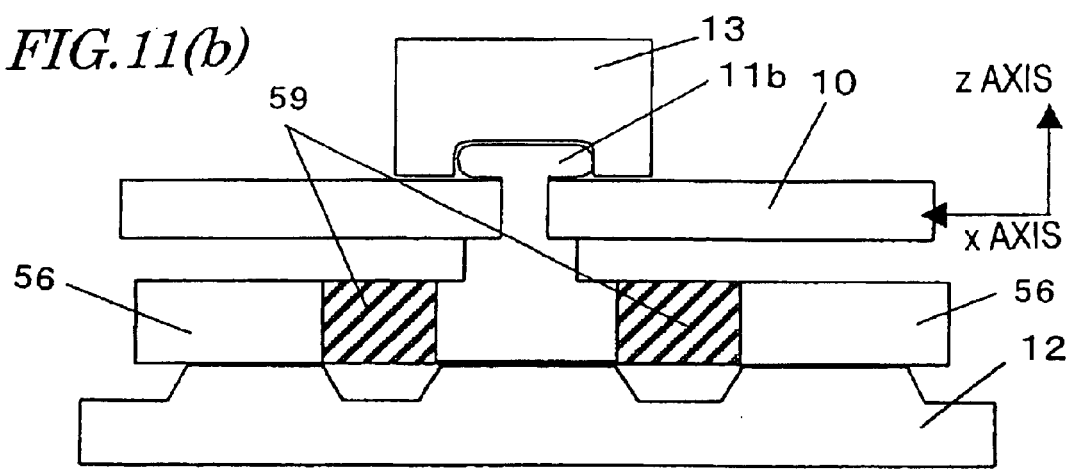

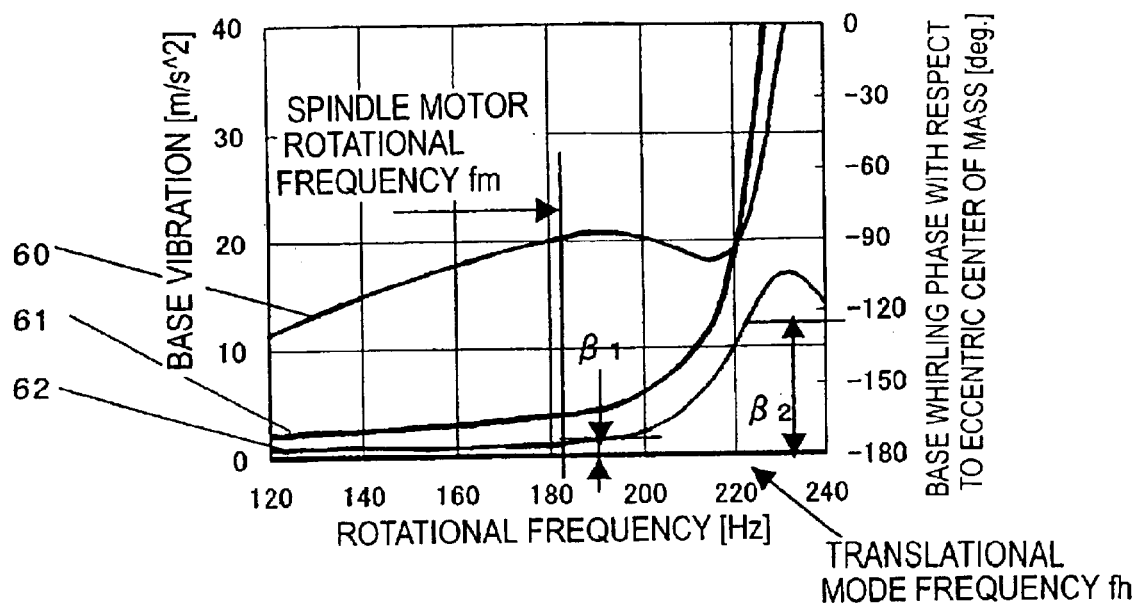
FIG. 17(a)  VIBRATION IN x-AXIS (y-AXIS) DIRECTION
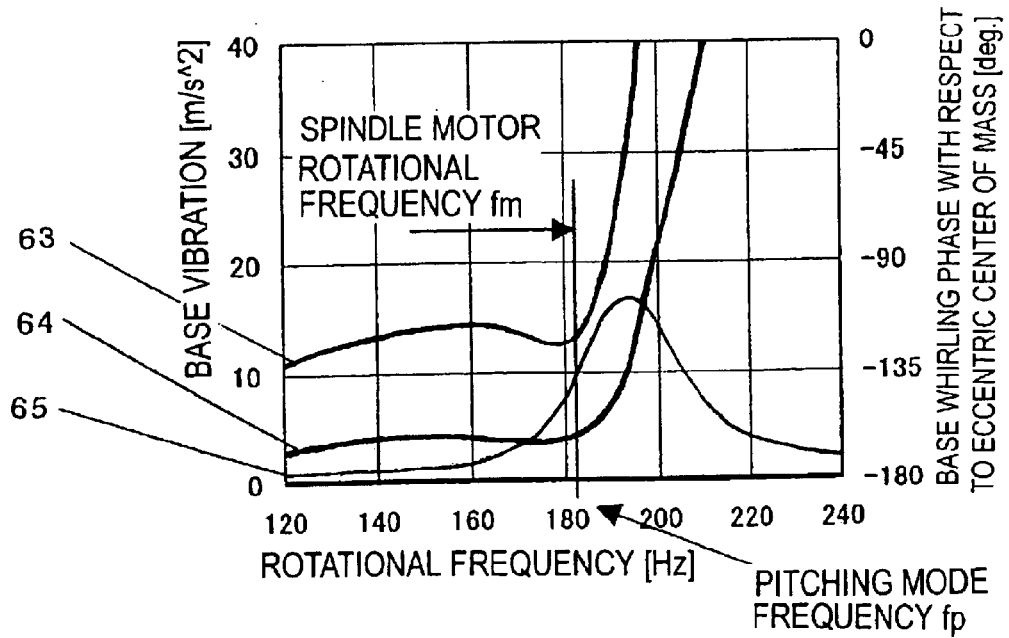
FIG. 17(b)  VIBRATION IN z-AXIS DIRECTION $fm < f1$ $fm > f1$

US 6,834,393 B2

1

DISK DEVICE

TECHNICAL FIELD

The present invention relates to a disk drive for use to write and/or read information on/from a disk storage medium (which will be herein simply referred to as a "disk"), and more particularly relates to a disk drive that generates a minimized degree of vibration even when a disk is rotated at a high velocity.

BACKGROUND ART

In recent years, to increase the data transfer rates of various types of disk drives such as a CD-ROM drive, it has become more and more necessary to further increase the rotational velocity of the disk. However, the disk normally has unbalanced mass due to a variation in its thickness, for example, and has a center of mass at a position that has shifted from its real center (i.e., has an eccentric center of mass). When such a disk is rotated at a high velocity, an unbalanced centrifugal force (unbalanced force) is applied onto the center of rotation of the disk, thus generating some vibration in the disk drive. The magnitude of this unbalanced force increases proportionally to the square of the rotational frequency. Accordingly, as the rotational frequency of the disk is increased, the amplitude of the vibration increases steeply. That is to say, when the disk is rotated at a high velocity, the disk drive vibrates significantly, and cannot perform its write or read operation with good stability. Furthermore, the vibration generated is also transmitted to external units outside of the disk drive. Thus, when such a disk drive is built in a computer, for example, other peripheral units are affected as well by the vibration that has been transmitted thereto. In view of these considerations, to increase the data transfer rate by increasing the rotational velocity of the disk, the vibration of the disk drive needs to be minimized.

To overcome the problems described above, according to a known technique, the vibration of a disk drive is minimized by getting the mass eccentricity of a disk corrected automatically by an auto-balancer, which includes balancing members such as balls. This technique is disclosed in Japanese Patent Publication No. 2824250, for example. Hereinafter, the configuration and operation of a conventional disk drive including the auto-balancer will be described with reference to FIGS. 18 and 19.

FIG. 18 is a cross-sectional view illustrating a configuration for the conventional disk drive. This disk drive includes a spindle motor 2 with a turntable 18, and an auto-balancer 16. A disk 1 is sandwiched between the turntable 18 and the auto-balancer 16. By driving the spindle motor 2, the disk 1 rotates along with the turntable 18 around a rotation axis P0.

As shown in FIG. 19, the auto-balancer 16 includes a hollow ring portion 23 that is concentric with the rotation axis P0. Inside the hollow ring portion 23, multiple balancing members 17 are stored. The balancing members 17 may be a number of iron balls, for example, and can move inside the hollow ring portion 23.

Referring back to FIG. 18, the spindle motor 2 is secured to a sub-base 6, which in turn is fixed to a main base 8 by way of insulators (first elastic members) 7 that serve as elastic members. The vibration and impact that are externally applied to the sub-base 6 by way of the main base 8 are dammed by the insulators 7.

The vibration system that is made up of the main base 8, sub-base 6 and insulators 7 has a natural frequency (i.e., resonance frequency) at which vibration is transmitted from the main base 8 to the sub-base 6 at the maximum transmissibility. In this disk drive, the natural frequency f1 in a mode in which the sub-base 6 vibrates parallelly to the recording surface of the disk 1 is defined to be lower than the rotational frequency fm of the disk 1 by selecting an appropriate material for the insulators 7 or by any other suitable technique. For example, when the rotational frequency fm is 100 Hz, the natural frequency f1 may be set to 60 Hz.

Hereinafter, it will be described how the conventional disk drive having such a configuration operates to rotate a disk having an eccentric center of mass. As shown in FIG. 19, the center of mass G1 of the disk 1 is located at a position that has shifted from the rotation axis P0. Accordingly, when the disk 1 is rotated, a centrifugal force F is generated and oriented from the rotation axis P0 toward the center of mass G1. The specific direction in which this centrifugal force F is applied changes as the disk rotates. It should be noted that this centrifugal force F is generated due to the unbalanced mass of the disk 1 and will be herein sometimes referred to as an "unbalanced force". When such an unbalanced force F is applied, the disk 1 and the sub-base 6 make a whirling motion with respect to the main base 8.

In this case, the whirling motion changes in accordance with the relationship between the rotational frequency fm of the disk 1 and the natural frequency f1. Specifically, if the rotational frequency fm of the disk 1 is sufficiently lower than the natural frequency f1, then no phase delay is created and the direction in which the unbalanced force F is applied (from the rotation axis P0 toward the center of mass G1) is the same as the direction in which the sub-base 6 is displaced (see FIG. 20(a)). On the other hand, if the rotational frequency fm is sufficiently higher than the natural frequency f1 as described above, then a phase delay is created. Accordingly, the direction in which the unbalanced force F is applied becomes substantially opposite to the direction in which the sub-base 6 is displaced (see FIG. 20(b)). In this case, the whirling center axis P1 is located between the center of mass G1 of the disk and the rotation axis P0.

Hereinafter, it will be described how the auto-balancer 16 operates when the whirling center axis P1 is located between the center of mass G1 of the disk and the rotation axis P0. While the whirling motion is being made, a centrifugal force q is applied from the whirling center axis P1 toward the balancing members 17 that are stored inside the hollow ring portion 23. On the other hand, a drag force N is also applied from the outer sidewall 25 of the hollow ring portion 23 toward the balancing members 17. This drag force N is applied toward the rotation axis (i.e., the center of rotation) P0 that is also the center of the auto-balancer 16 and the center of the outer sidewall 25. Consequently, a moving force R is applied as a resultant force of the centrifugal force q and the drag force N to the balancing members 17 in a tangential direction of the hollow ring portion 23. This moving force R moves the balancing members 17 along the outer sidewall 25. As a result, the balancing members 17 gather toward a position that is substantially opposite to the center of mass G1 of the disk 1 with the whirling center axis P1 interposed between them. That is to say, while the disk 1 is being rotated, the auto-balancer 16 operates in such a manner as to have its center of mass located on an extension of the line that connects together the center of mass G1 of the disk 1 and the whirling center axis P1. Thus, a centrifugal force Q is applied to the auto-balancer 16 in the direction opposite to the direction in which the unbalanced force F is applied. That is to say, the unbalanced force F is canceled by this centrifugal force Q, thus decreasing the magnitude of the force being applied to the sub-base 6. Consequently, the vibration of the sub-base 6 can be reduced.

In this disk drive, however, if the unbalanced force F being canceled decreases, then the moving force R applied to the balancing members 17 also decreases. In such a situation, the balancing members sometimes cannot reach their ideal positions because the balancing members receive a frictional resistance from the hollow ring portion 23, for example. Then, the desired vibration damping effects are not achievable and a residual vibration is generated. Also, the residual vibration may have not only a component that is parallel to the disk plane but also a component that is vertical to the disk plane as well. In that case, various problems arise. For example, a so-called "crosstalk" phenomenon is created to increase the vertical vibration unintentionally.

In addition, in the conventional disk drive described above, it is difficult to provide the auto-balancer and the disk plane on the same plane. Accordingly, the level difference between the centrifugal force applied to the auto-balancer and that applied to the eccentric center of mass of the disk generates a moment, thus increasing the vibration in a direction in which the rotation axis of the disk tilts. When the vibration increases in that direction in which the rotation axis of the disk tilts, the smooth movement of the balancing members may sometimes be interfered with. As a result, the ability of the auto-balancer to correct the mass eccentricity of the disk declines.

If the disk is rotated at a higher velocity, the centrifugal force applied to the center of mass increases proportionally to the square of the number of revolutions. Accordingly, even if the distance between the center of mass of the disk that has been corrected by the auto-balancer and the center of rotation is relatively short, a relatively great vibration is generated. For that reason, it is difficult for the conventional disk drive including the auto-balancer to increase the data transfer rate by rotating the disk at a higher velocity.

On the other hand, according to another known technique, the vibration of a disk drive may also be reduced by getting the vibration, which is generated by rotating a disk with an eccentric center of mass, absorbed into a dynamic vibration absorber. Such a technique is disclosed in Japanese Laid-Open Publication No. 11-328944 and Japanese Patent Publication No. 2951943, for example. In this technique, a dynamic vibration absorber having predetermined mass is connected to a member (e.g., the sub-plate 6), which vibrates (or whirls) with the rotation of a disk having an eccentric center of mass, by way of an elastic member. The dynamic vibration absorber functions in such a manner as to absorb the vibration generated.

In the method of reducing the vibration of the disk drive by using the dynamic vibration absorber, however, the centrifugal force itself, which is generated when the disk having an eccentric center of mass is rotated, cannot be reduced. Accordingly, the spindle motor or the base should have rigidity that is great enough to overcome the centrifugal force applied to the eccentric center of mass. Furthermore, to minimize the vibration effectively, the mass of the disk drive and the dynamic vibration absorber should be increased proportionally to the square of the number of revolutions of the disk. Accordingly, the disk drive should increase its own weight excessively, which is a problem.

In order to overcome the problems described above, an object of the present invention is to provide a disk drive that can minimize the vibration to be generated when a disk having an eccentric center of mass is rotated at a high velocity and thereby can perform a write or read operation with good stability.

DISCLOSURE OF INVENTION

A disk drive according to the present invention includes: a motor with a rotating portion to rotate a disk thereon; an auto-balancer, which is connected to the rotating portion of the motor and which is able to change its center of mass; a base, which is secured to the motor and which is connected to an external member by way of a first elastic member; and a dynamic vibration absorber, which is connected to the base by way of a second elastic member. In this disk drive, if the disk makes a whirling motion while being rotated by the motor, a relationship between a first natural frequency of a first vibration system, which includes the base, the first elastic member and the external member, as measured parallelly to a base plane and a rotational frequency of the disk and a relationship between a second natural frequency of a second vibration system, which includes the dynamic vibration absorber, the second elastic member and the base, as measured parallelly to the base plane and the rotational frequency of the disk are defined so that a phase angle of 120 degrees to 180 degrees is formed between a direction that is pointed from a whirling center axis toward a center of mass of the disk and a direction that is pointed from the whirling center axis toward the center of mass of the auto-balancer.

In a preferred embodiment, the disk drive rotates the disk at a frequency that is substantially equal to a third natural frequency of the second vibration system as measured vertically to the base plane.

In another preferred embodiment, the first natural frequency is at most $1/\sqrt{2}$ time as high as the rotational frequency of the disk.

In another preferred embodiment, the second natural frequency is 1.05 to 2 times as high as the rotational frequency of the disk.

In another preferred embodiment, the auto-balancer includes a hollow ring member and moving members that are stored inside the hollow ring member so as to be movable therein.

In another preferred embodiment, the auto-balancer is secured to the rotating portion of the motor.

In another preferred embodiment, vibration is transmitted from the external member to the base at a transmissibility of greater than three at the first natural frequency.

In another preferred embodiment, vibration is transmitted from the base to the dynamic vibration absorber at a transmissibility of greater than three at the second natural frequency.

In another preferred embodiment, the first elastic member is made of either a silicone rubber material or a natural rubber material.

In another preferred embodiment, the second elastic member is made of either a silicone rubber material or a natural rubber material.

In another preferred embodiment, the auto-balancer is provided on both sides of the disk.

In another preferred embodiment, the center of mass of the dynamic vibration absorber is located within a plane that is parallel to the disk plane and that is leveled with the center of thickness of the disk.

In another preferred embodiment, the center of mass of the dynamic vibration absorber is located on an axial line that defines the rotation center axis of the disk.

In another preferred embodiment, the dynamic vibration absorber is provided between the disk and the base.

Another disk drive according to the present invention includes: a motor with a rotating portion to rotate a disk thereon; an auto-balancer, which is connected to the rotating portion of the motor and which is able to change its center of mass; a base, which is secured to the motor; and a dynamic vibration absorber, which is connected to the base by way of multiple elastic members. A natural frequency of the dynamic vibration absorber in a translational mode in which the absorber makes a translational motion with respect to a base plane of the base is different from a natural frequency of the dynamic vibration absorber in an angular displacement mode in which the absorber is displaced angularly with respect to the base plane of the base.

In a preferred embodiment, the natural frequency in the translational mode is higher than a rotational frequency of the disk, and the natural frequency in the angular displacement mode is substantially equal to the rotational frequency of the disk.

In another preferred embodiment, the natural frequency in the angular displacement mode is defined by adjusting a distance between a center of mass of the dynamic vibration absorber and the multiple elastic members that support the dynamic vibration absorber thereon.

In another preferred embodiment, the natural frequency in the angular displacement mode is defined by adjusting a moment of inertia around the center of mass of the dynamic vibration absorber.

In another preferred embodiment, each of the multiple elastic members is provided between the inner wall of an opening of the base and a convex fixing member. The fixing member is connected to the dynamic vibration absorber and inserted into the opening.

In another preferred embodiment, the convex fixing member extends through the dynamic vibration absorber, and the top of the fixing member that extends through the dynamic vibration absorber is fixed to the dynamic vibration absorber at one end thereof by a press-fixing technique in which the top is heated and crushed.

In another preferred embodiment, the fixing member includes a rotation stopping portion, and the dynamic vibration absorber is screwed to the fixing member.

Still another disk drive according to the present invention includes: a motor with a rotating portion to rotate a disk thereon; an auto-balancer, which is connected to the rotating portion of the motor and which is able to change its center of mass; a base, which is secured to the motor; and a dynamic vibration absorber, which is connected to the base by way of an elastic member. In the disk drive, a natural frequency of the dynamic vibration absorber in a mode in which the absorber makes a translational motion with respect to a base plane of the base is different from a natural frequency of the dynamic vibration absorber in a mode in which the absorber makes a translational motion vertically to the base plane of the base.

In a preferred embodiment, the natural frequency in the mode in which the absorber makes the translational motion with respect to the base plane is higher than a rotational frequency of the disk, and the natural frequency in the mode in which the absorber makes the translational motion vertically to the base plane of the base is substantially equal to the rotational frequency of the disk.

BRIEF DESCRIPTION OF DRAWINGS

FIGS. 8(a) and 8(b) illustrate a configuration for a disk drive according to a fourth embodiment of the present invention, wherein: FIG. 8(a) is a cross-sectional view of the disk drive; and FIG. 8(b) is plan view of the dynamic vibration absorber thereof.

FIGS. 11(a) and 11(b) are cross-sectional views illustrating how the dynamic vibration absorber may be supported and fixed in the disk drive according to the fifth embodiment of the present invention, wherein: FIG. 11(a) illustrates a state before the dynamic vibration absorber is fixed thereto; and FIG. 11(b) illustrates a state after the dynamic vibration absorber has been fixed thereto.

FIGS. 17(a) and 17(b) are graphs showing relationships between the rotational frequency of the spindle motor and the vibration of the base in the disk drive according to the fifth embodiment of the present invention.

FIGS. 20(a) and 20(b) illustrate whirling motions that are produced when a disk having an eccentric center of mass is rotated, wherein: FIG. 20(a) illustrates a situation where the natural frequency of a vibration system is higher than the rotational frequency; and FIG. 20(b) illustrates a situation where the natural frequency of the vibration system is lower than the rotational frequency.

BEST MODE FOR CARRYING OUT THE INVENTION

The present inventor carried out a research to observe how the vibration to be generated in a disk drive is minimized by using an auto-balancer that can correct the mass eccentricity of a disk and how the vibration is absorbed by using a dynamic vibration absorber. As a result, the present inventor discovered that when the auto-balancer and the dynamic vibration absorber are both used, they do not always function independently of each other but may cause interaction between them. Accordingly, just by using the conventional auto-balancer and dynamic vibration absorber for a disk drive, these members may function inappropriately and the desired vibration minimization effects may be unachievable. Thus, when the auto-balancer and the dynamic vibration absorber are used in combination, it is important to reduce the overall vibration to be generated during the rotation of the disk by allowing both of these members to function properly.

In view of these considerations, the present inventor discovered that if the natural frequency of a vibration system including the sub-base to which the auto-balancer is fixed and the natural frequency of another vibration system including the dynamic vibration absorber are defined so as to satisfy predetermined relationships with the rotational frequency of the disk, then the auto-balancer and the dynamic vibration absorber both can function effectively. The present inventor also discovered that if the natural frequencies of the dynamic vibration absorber that vibrates in a translational mode and in an angular displacement mode are defined so as to satisfy predetermined relationships with the rotational frequency, then the dynamic vibration absorber and the auto-balancer both can function properly and vibrations in different modes can be minimized effectively. As a result, the vibration to be generated during the rotation of the disk can be minimized effectively by using the auto-balancer and the dynamic vibration absorber. In addition, even when the disk is rotated at a high velocity, the write or read operation can be performed with good stability.

Figure 18:
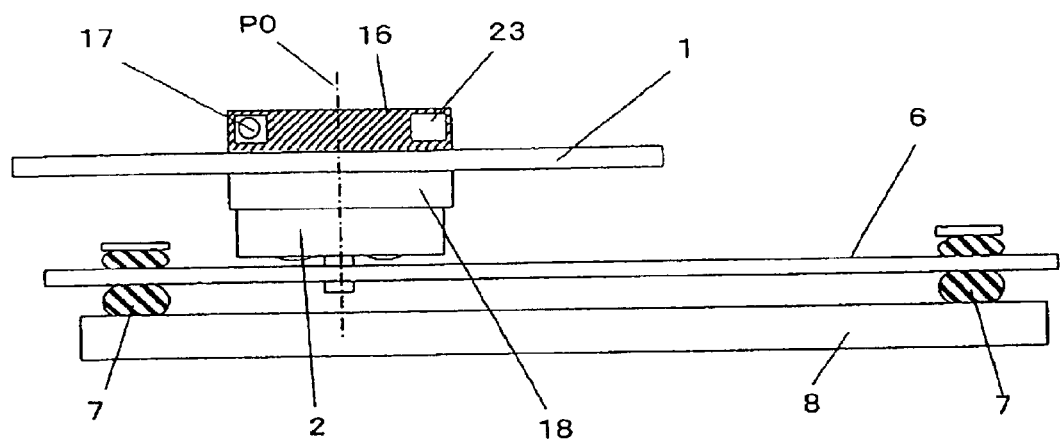
FIG. 18 is a cross-sectional view illustrating a configuration for a conventional disk drive that includes an auto-balancer.
Figure 19:
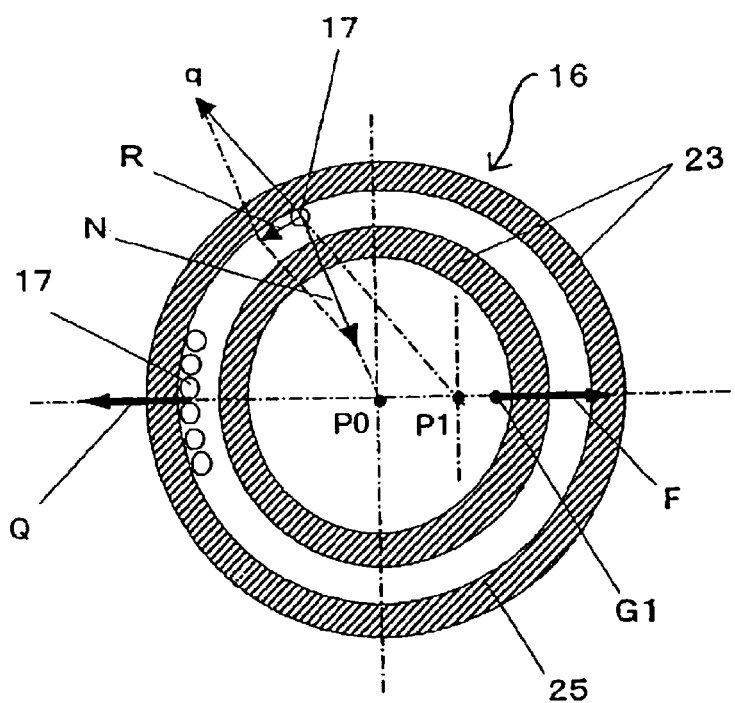
FIG. 19 is a cross-sectional view illustrating the auto-balancer of the conventional disk drive.
Figure 20A:
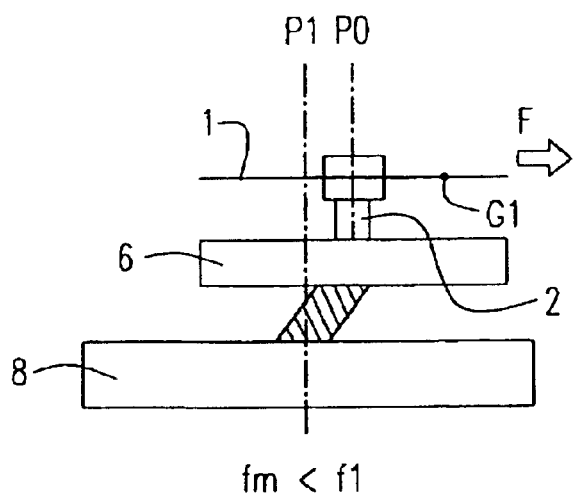
Figure 20B:
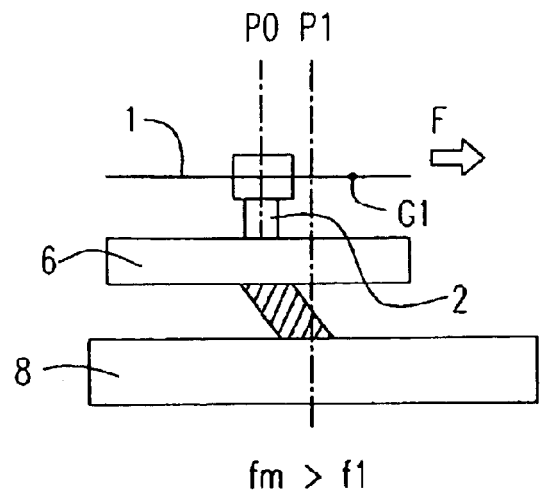

Hereinafter, preferred embodiments of the present invention will be described with reference to the accompanying drawings. In the following description, each member having substantially the same function as the counterpart of the conventional disk drive shown in FIG. 18 will be identified by the same reference numeral.

Embodiment 1

Figure 1:
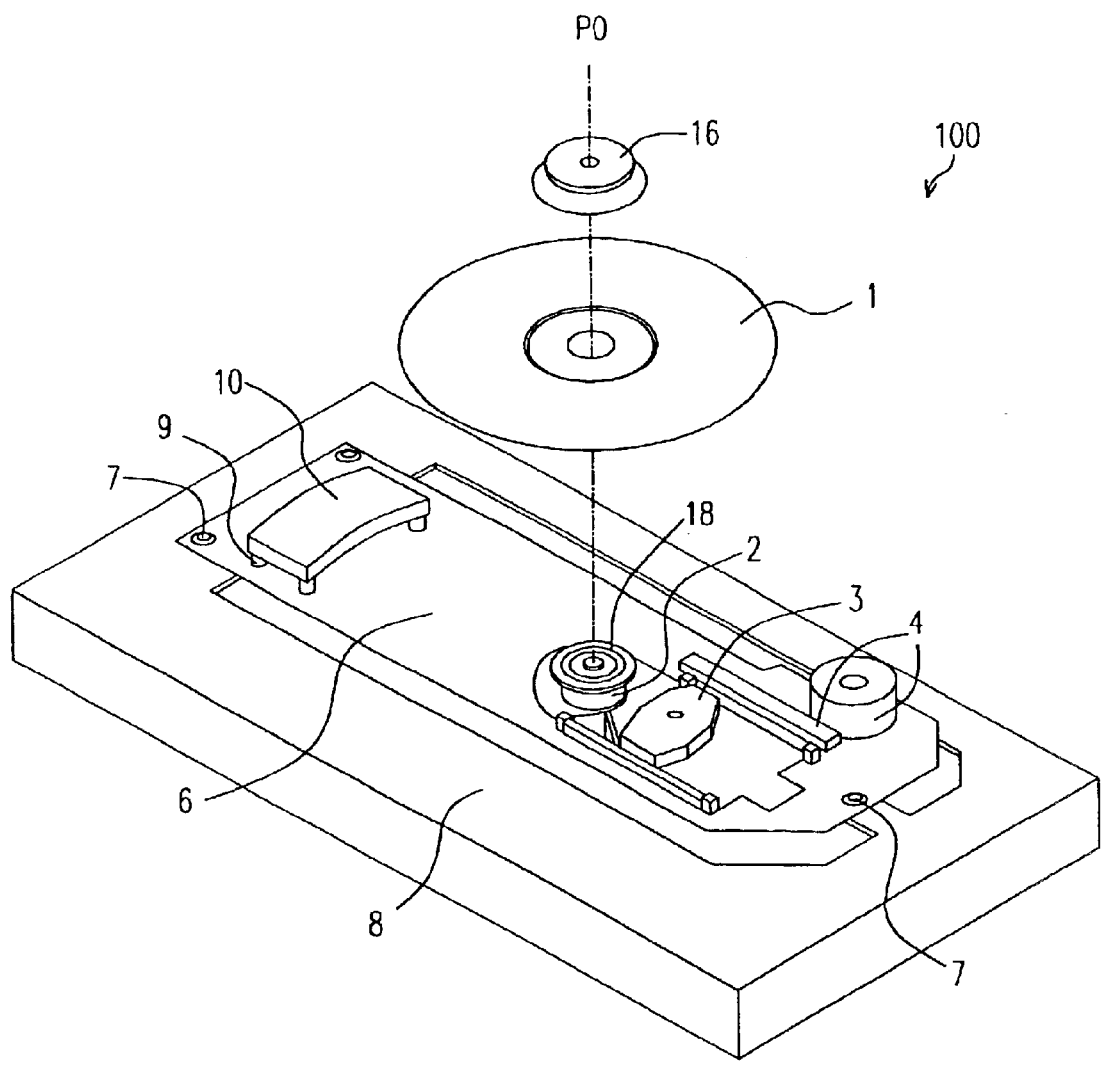
FIG. 1 is a perspective view illustrating a configuration for a disk drive according to a first embodiment of the present invention.
Figure 2:
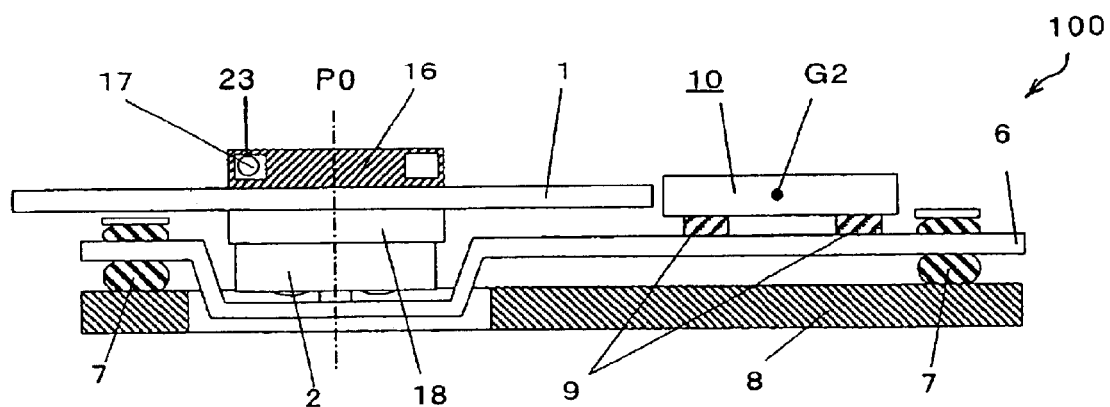
FIG. 2 is a cross-sectional view illustrating the configuration of the disk drive according to the first embodiment of the present invention.

FIG. 1 is a perspective view of a disk drive 100 according to a first embodiment of the present invention and FIG. 2 is a cross-sectional view thereof. As shown in FIGS. 1 and 2, the disk drive 100 includes a spindle motor 2 with a turntable 18 and an auto-balancer 16. The disk 1 is sandwiched between the turntable 18 and the auto-balancer 16.

The spindle motor 2 is secured to a sub-base 6, which in turn is fixed onto a main base 8 by way of first elastic members 7. The vibration and impact that are externally applied from the outside of the disk drive to the sub-base 6 by way of the main base 8 are dammed by the first elastic members 7. Furthermore, a dynamic vibration absorber 10 having a center of mass G2 is also secured onto the sub-base 6 by way of second elastic members 9 so as to absorb the vibration of the sub-base 6.

In this disk drive 100, when the spindle motor 2 is driven, the disk 1 is rotated around a rotation axis P0 along with the turntable 18 and the auto-balancer 16 that are secured to the shaft of the motor 2. Reading the data that is stored on the disk 1 or writing data onto the disk 1 is carried out by using an optical member (head) 3 and a head transporting mechanism 4 that are provided on the sub-base 6 (see FIG. 1).

In this embodiment, the auto-balancer 16 includes a hollow ring portion 23 that is concentric with the rotation axis P0 and multiple balancing members 17 that are stored inside the hollow ring portion 23. The balancing members 17 may be a number of (e.g., six) iron balls that can move inside the hollow ring portion 23. However, a member having any other shape may also be used as the auto-balancer 16. That is to say, the auto-balancer may have any other shape as long as the auto-balancer can change the position of its center of mass with respect to the disk plane and can function in such a manner as to correct the mass eccentricity of the disk while being rotated along with the disk 1. For example, the balancer 16 may be shaped as a circular plate or a ring having an eccentric center of mass. Also, a liquid that is stored inside the hollow ring portion 23 may be used as the balancing members 17.

Next, a frequency transmission characteristic of a first vibration system (curve 61) representing how vibration is transmitted from the main base 8 to the sub-base 6 and a frequency transmission characteristic of a second vibration system (curve 101) representing how vibration is transmitted from the sub-base 6 to the dynamic vibration absorber 10 in the disk drive of this embodiment will be described with reference to FIG. 3. In this case, the first vibration system is made up of the main base 8, sub-base 6 and first elastic members 7, while the second vibration system is made up of the sub-base 6, dynamic vibration absorber 10 and second elastic members 9.

Figure 3:
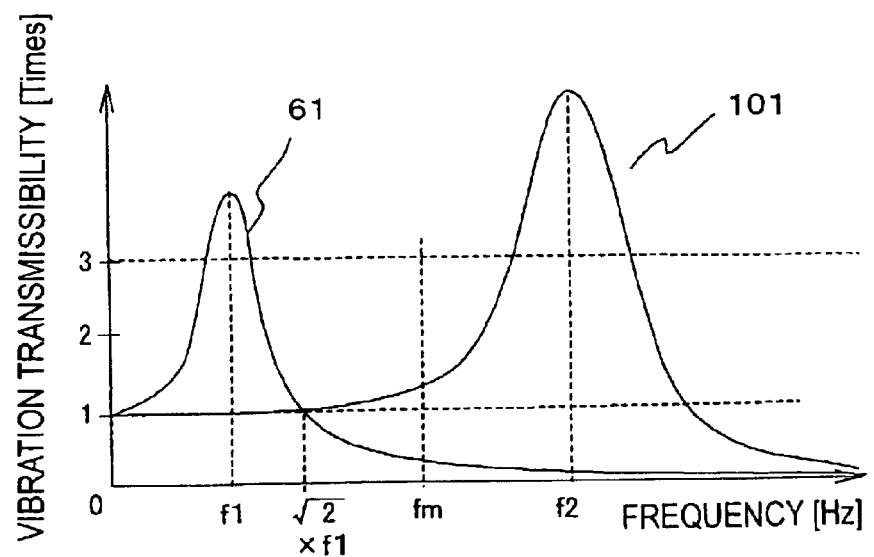
FIG. 3 is a graph showing the frequency transmission characteristics of the sub-base and dynamic vibration absorber in the disk drive according to the first embodiment of the present invention.

As indicated by the curve 61 in FIG. 3, the first vibration system in which the sub-base 6 vibrates with respect to the main base has a natural frequency $f_1$ that is defined for the sub-base 6 (i.e., a natural frequency $f_1$ in a translational mode) by the deformation of the first elastic members 7 while a mechanical vibration is created parallelly to the recording plane of the disk 1 (or to the base plane of the sub-base 6). Also, as indicated by the curve 101, the second vibration system has a natural frequency $f_2$ that is defined for the dynamic vibration absorber 10 (i.e., a natural frequency $f_2$ in the translational mode) by the deformation of the second elastic members 9 while the mechanical vibration is created parallelly to the recording plane of the disk 1 (or to the base plane of the sub-base 6).

It should be noted that each of these vibration systems may have mutually different natural frequencies in at least two directions that are parallel to the base plane (or within the base plane). In this embodiment, however, the natural frequencies in respective directions within the base plane are supposed to be substantially equal to each other.

In this embodiment, supposing the principal rotational frequency of the disk 1 (i.e., the maximum rotational frequency thereof during the operation of the disk drive in this embodiment) is identified by $f_m$, the natural frequency $f_1$ is defined to be $1/\sqrt{2}$ time (i.e., about 0.71) or less as high as the rotational frequency $f_m$. The natural frequency $f_1$ may be defined by selecting an appropriate shape or strength for the first elastic members 7. On the other hand, the natural frequency $f_2$ is defined to be higher than the rotational frequency $f_m$. More specifically, the spring constant of the second elastic members 9 is defined so that the natural frequency f2 becomes 1.05 to 2 times as high as the rotational frequency fm. For example, when the rotational frequency fm is defined at about 183 Hz, the natural frequency f1 of the horizontal vibration of the sub-base 6 with respect to the main base 8 may be defined at about 35 Hz, while the natural frequency f2 of the horizontal vibration of the dynamic vibration absorber 10 with respect to the sub-base 6 may be defined at about 200 Hz.

Although not shown in FIG. 3, there also exists a natural frequency f3 that is defined for the dynamic vibration absorber 10 by the deformation of the second elastic members 9 while a mechanical vibration (or translational motion) is created vertically to the recording plane of the disk 1 (or to the base plane of the sub-base 6). The shape, hardness or any other parameter of the second elastic members 9 is preferably defined such that this natural frequency f3 is substantially equal to the rotational frequency fm of the disk 1.

Hereinafter, it will be described how the disk drive rotates the disk 1 having an eccentric center of mass when the relationships between the respective natural frequencies f1 and f2 and the rotational frequency fm of the disk 1 are defined as such.

Figure 4A:
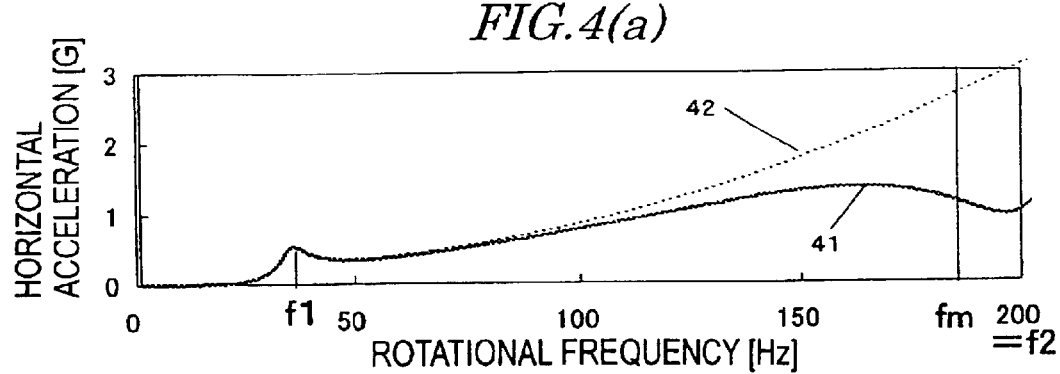
FIGS. 4(a), 4(b) and 4(c) are graphs showing relationships between the rotational frequency of the disk and the vibration generated in the sub-base of the disk drive according to the first embodiment of the present invention.
Figure 4B:
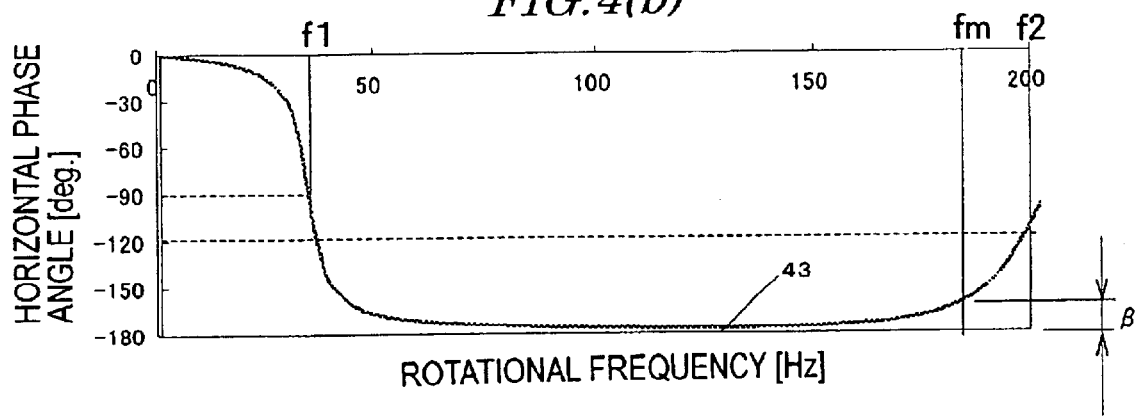
Figure 4C:
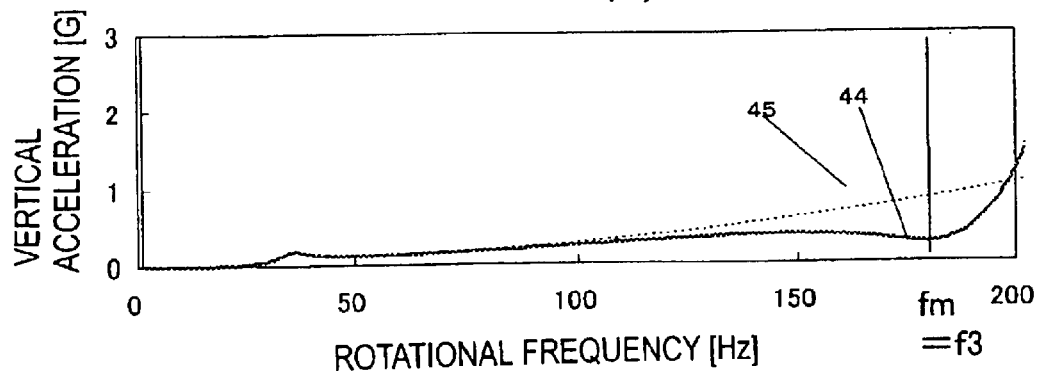

FIGS. 4(a), 4(b) and 4(c) are graphs showing relationships between the rotational frequency of the disk and the vibration generated in the sub-base 6 in the disk drive according to this embodiment. FIG. 4(a) represents the acceleration G, which is applied onto the sub-base 6 that is vibrating parallelly to the disk plane, with respect to the rotational frequency as the abscissa. The curve 41 represents the vibration acceleration of the sub-base 6 in this embodiment while the curve 42 represents the vibration acceleration of the sub-base 6 when the dynamic vibration absorber 10 is completely fixed onto the sub-base 6. That is to say, the curve 42 corresponds to a graph representing the vibration acceleration of the sub-base 6 of a disk drive that includes no dynamic vibration absorbers.

FIG. 4(b) represents the vibration phase α of the sub-base 6 in the direction parallel to the disk plane with respect to the rotational frequency as the abscissa. This vibration phase α represents the phase delay of the displacement direction of the sub-base 6 from the direction in which the unbalanced force is applied onto the eccentric center of mass of the disk during the rotation operation thereof.

Since a centrifugal force is applied onto the center of mass G1 of the disk 1, a periodic unbalanced force is applied onto the sub-base 6. Due to this unbalanced force, the first elastic members 7 are deformed, and the sub-base 6 and the respective members mounted on the sub-base 6 all whirl at the rotational frequency fm of the disk 1. In this case, the natural frequency f1 (about 35 Hz) of the sub-base 6 as defined by the deformation of the first elastic members 7 is set lower than the rotational frequency fm (about 183 Hz) of the disk 1. Thus, as shown in FIG. 4(b), the displacement direction of the sub-base 6 is substantially opposite to the direction in which the unbalanced force is applied (i.e., the vibration phase α becomes approximately −180 degrees).

Generally speaking, in a mechanical vibration system that is made up of spring and mass, a phase shift starts to be created between the frequency of a periodic external force that is applied onto the mass in the vicinity of its natural frequency and the frequency at which the mass is displaced responsive to the external force. And when the frequency of the external force is equal to the natural frequency of the mechanical vibration system, the phases are shifted from each other by 90 degrees. Furthermore, when the frequency of the external force is sufficiently higher than the natural frequency, the phase shift becomes approximately equal to 180 degrees. As a result, the direction in which the external force is applied becomes opposite to the direction in which the vibration system is displaced. In this embodiment, the centrifugal force F that is applied onto the center of mass G1 acts on the sub-base 6 as a periodic external force having the frequency fm. If the rotational frequency fm is sufficiently higher than the natural frequency f1 at which the sub-base 6 vibrates with respect to the main base 8, then the direction in which the centrifugal force is applied to the center of mass G1 and the direction in which the sub-base 6 is displaced are different from each other by 180 degrees, or substantially opposite to each other. Particularly, in this embodiment, the natural frequency f1 of the sub-base 6 is defined to be $1\sqrt{2}$ time (about 0.71) or less as high as the rotational frequency fm of the disk. Accordingly, the external force that is applied at the rotational frequency fm belongs to a range where the vibration of the sub-base 6 is dammed (i.e., a frequency range in which the vibration transmissibility becomes one or less). Consequently, the vibration can be minimized without increasing the amplitude of the vibration.

Also, when the direction in which the unbalanced force is applied (from the rotation axis P0 toward the center of mass G1 of the disk) and the displacement direction of the sub-base (from the whirling center P1 toward the rotation axis P0) are substantially opposite to each other as described above, the auto-balancer 16 functions in such a manner as to cancel the unbalanced force. In this case, if the auto-balancer 16 could completely correct the mass eccentricity of the disk 1, then no vibration would be generated. However, if the movement of the balancing members 17 is interfered with by the frictional resistance that is received from the outer sidewall 25 or the bottom of the hollow ring portion 23 as described above, then a residual vibration will be generated.

When the sub-base 6 vibrates at the rotational frequency fm due to this residual vibration, the dynamic vibration absorber 10, which is secured to this sub-base 6 by way of the second elastic members 9, operates so as to have its phase delayed from that of the vibration of the sub-base 6, thereby absorbing the vibration of the sub-base 6. Consequently, as indicated by the curve 41 in FIG. 4(a), the vibration acceleration of the sub-base 6 at the rotational frequency fm decreases significantly as compared to the situation where the dynamic vibration absorber 10 is fixed (as indicated by the curve 42). However, to get the vibration absorbed into the dynamic vibration absorber 10 effectively, the rotational frequency fm (i.e., the vibration frequency of the sub-base 6) is preferably lower than, but not too much lower than, the horizontal natural frequency f2 of the dynamic vibration absorber 10 that is connected to the sub-base 6 by way of the second elastic members 9 (i.e., the translational mode natural frequency of the vibration system that is made up of the sub-base 6, dynamic vibration absorber 10 and second elastic members 9).

However, if the difference between the rotational frequency fm and the natural frequency f2 is small, the shift in vibration phase between the dynamic vibration absorber 10 and the sub-base 6 becomes relatively great. In that case, the displacement direction of the sub-base 6 greatly shifts from that of the dynamic vibration absorber 10 and the sub-base 6 receives reaction from the dynamic vibration absorber 10 vibrating. As a result, as shown in FIG. 4(b), the vibration phase of the sub-base 6 starts to shift when the difference reaches 180 degrees (i.e., when the phase is completely inverted) and soon has a phase angle β. Particularly when the rotational frequency fm is almost equal to the natural frequency f2 of the dynamic vibration absorber 10, the vibration can be absorbed into the dynamic vibration absorber 10 effectively as shown in FIG. 4(a). However, as shown in FIG. 4(b), the vibration phase of the sub-base 6 will shift greatly after the difference reaches 180 degrees (i.e., once the phase is completely inverted).

Figure 5:
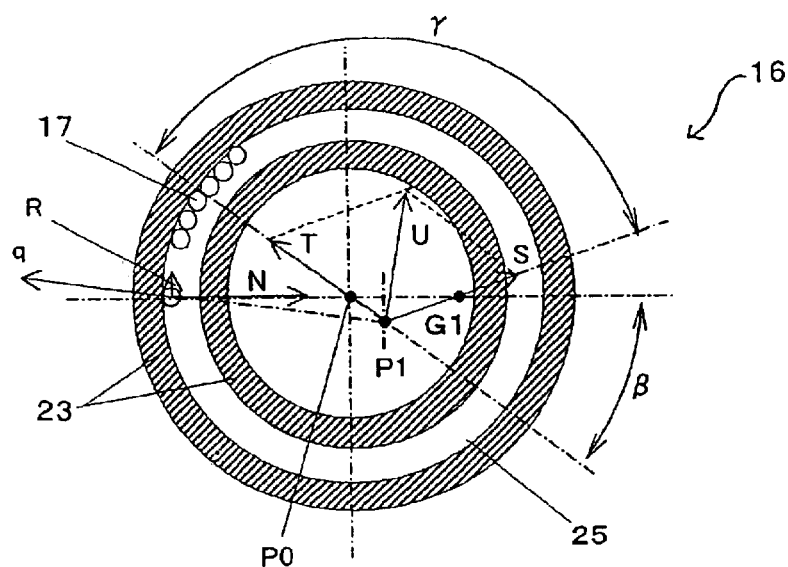
FIG. 5 is a cross-sectional view illustrating the auto-balancer of the disk drive according to the first embodiment of the present invention.

In this manner, if the vibration phase of the sub-base shifts by β due to the reaction that is received from the dynamic vibration absorber 10, the whirling center axis P1 moves to a position that defines the phase angle β with the position where the dynamic vibration absorber 10 is not functional (i.e., a point on the line that connects together the center of rotation P0 and the center of mass G1) as shown in FIG. 5.

In that case, an unbalanced force S is applied from the whirling center P1 toward the center of mass G1 of the disk. Also, the auto-balancer 16 makes a whirling motion around the whirling center axis P1. A centrifugal force q that is applied in a direction that connects the whirling center axis p1 to the center of mass of the balancing members 17 and a drag force N that is received from the outer sidewall of the hollow ring portion 23 act on the balancing members 17 that are stored inside the hollow ring portion 23. When subjected to a moving force R as a resultant force of this centrifugal force q and the drag force N, the balancing members 17 gather toward a position that is substantially opposite to the whirling center P1 with respect to the center of rotation P0. As a result, a centrifugal force T is applied toward the center of mass of the auto-balancer. Supposing the unbalanced force S and the centrifugal force T define a phase angle γ between them, the balancing members 17 gather toward a position that is shifted from the direction of the unbalanced force S substantially by the phase angle γ.

In this case, the resultant force U of the unbalanced force S and the centrifugal force T acts on the sub-base 6. However, if the magnitude of the resultant force U is smaller than that of the unbalanced force S, then the vibration of the disk drive still can be minimized effectively by the auto-balancer 16. For this purpose, the disk drive of this embodiment is operated in such a manner that the phase angle γ becomes 120 degrees or more but 180 degrees or less. To define the phase angle γ within this range, the relationship between the rotational frequency fm and the natural frequency f2 of the dynamic vibration absorber should be defined appropriately. This is because unless the natural frequency f2 is higher than the rotational frequency fm to a certain degree, the phase angle β becomes too large and the phase angle γ becomes less than 120 degrees. For that reason, in this embodiment, the natural frequency f2 of the dynamic vibration absorber is defined to be at least 1.05 times as high as the rotational frequency fm.

Also, if the relationship between the rotational frequency fm and the natural frequency f2 of the dynamic vibration absorber is defined as described above and if the disk drive operates so as to have a phase angle γ of 120 degrees to 180 degrees, then the dynamic vibration absorber 10 vibrates in a substantially inverse phase with respect to the direction in which the unbalanced force is applied. Accordingly, the dynamic vibration absorber 10 can absorb the vibration of the sub-base 6. However, to get the vibration absorbed into the dynamic vibration absorber 10 effectively, the natural frequency f2 of the dynamic vibration absorber is preferably not too much higher than the rotational frequency fm. For that reason, in this embodiment, the natural frequency f2 is defined to be at most twice as high as the rotational frequency fm. If the natural frequency f2 is more than twice higher than the rotational frequency fm, then the vibration acceleration curve 41 shown in FIG. 4(a) will resemble the vibration acceleration curve 42 representing the situation where no dynamic vibration absorber is provided. In that case, although the construction is complicated, no desired vibration absorption effects are achievable.

In view of these considerations, the natural frequency f2 of the dynamic vibration absorber 10 is preferably defined to be 1.05 to 2 times as high as, more preferably about 1.1 times as high as, the rotational frequency fm of the disk 1.

Next, it will be described with reference to FIG. 4(c) what effects are achievable if the translational mode natural frequency f3 of the dynamic vibration absorber 10 that vibrates vertically to the disk plane is substantially equalized with the rotational frequency fm of the disk 1. FIG. 4(c) plots the acceleration G, which is applied onto the sub-base 6 vertically to the disk plane, with respect to the rotational frequency as the abscissa. In FIG. 4(c), a curve 44 representing the vibration acceleration of the sub-base of this embodiment and a curve 45 representing the vibration acceleration of the sub-base 6 to which the dynamic vibration absorber 10 is fixed are shown.

If the natural frequency f3 is substantially equalized with the rotational frequency of the disk 1, then the dynamic vibration absorber 10 can vibrate vertically to the disk plane while changing its phases with respect to the sub-base 6. As a result, the vibration can be reduced in the direction that is vertical to the disk plane. Unlike the phase shift in the direction that is parallel to the disk plane, the phase shift in the direction that is vertical to the disk plane has nothing to do with the phase of the balancing members 17. Accordingly, the natural frequency f3 of the second elastic members 9 in the vertical direction may also be defined so as to maximize the effects that are achieved by the dynamic vibration absorber 10. In this case, while the vibration is minimized in an in-plane direction that is parallel to the disk plane, the dynamic vibration absorber 10 vibrates in a substantially inverse phase with respect to the vibration of the sub-base 6 in an in-plane direction that is vertical to the recording plane of the disk 1. Accordingly, the vibration of the sub-base 6 (or the disk drive itself) can be reduced significantly in the direction vertical to the disk plane. As a result, vibration damping effects are achievable constantly as shown in FIG. 4(c).

Also, most of the components of the force that is applied onto the balancing members 17 are parallel to the disk plane, and therefore, the movement of the balancing members 17 may be limited to within a plane. Accordingly, when the balancing members 17 move, the effects caused by the friction between the balancing members 17 and the upper and lower surfaces of the hollow ring portion 23 decrease and the unbalanced force can be canceled by the auto-balancer more effectively.

To reduce the vertical vibration of the sub-base 6 effectively in this manner, the natural frequency f3 of the dynamic vibration absorber 10 in the mode in which the dynamic vibration absorber 10 makes the translational motion vertically to the base plane is preferably different from the natural frequency f2 thereof in the mode in which the dynamic vibration absorber 10 makes the translational motion with respect to the base plane. The natural frequency f2 is preferably defined to be 1.05 to 2 times as high as the rotational frequency fm, whereas the natural frequency f3 is preferably defined to be substantially equal to the rotational frequency fm. Such settings are easily realizable by appropriately selecting the position in which the dynamic vibration absorber 10 is supported by the second elastic members 9.

As described above, in the disk drive of this embodiment, the auto-balancer 16 acts on a disk having an eccentric center of mass in such a manner as to decrease the unbalance of its mass. In addition, the dynamic vibration absorber 10 serves to cancel the vibration that could not be eliminated by the auto-balancer 16. As a result, the vibration can be minimized. Also, even if the center of mass of the auto-balancer 16 has shifted from its desired position due to the reaction caused by the dynamic vibration absorber 10, the dynamic vibration absorber 10 can sufficiently compensate for the vibration minimization function of the auto-balancer 16. Thus, the vibration can be effectively reduced overall. In this manner, the auto-balancer 16 and the dynamic vibration absorber 10 can be both operated effectively. Accordingly, even if the disk having an eccentric center of mass is rotated at a high velocity, the vibration of the sub-base 6 can be minimized. Also, not just in the direction parallel to the disk plane but also in a direction vertical to the disk plane, can the dynamic vibration absorber 10 function in such a manner as to cancel the vibration of the sub-base 6. Consequently, a disk drive that can perform a write or read operation with good stability while minimizing the vibration and that can transfer data at a high rate is realizable.

It should be noted that if the first elastic members 7 are made of a natural rubber or silicone rubber material, then the transmissibility of the vibration from the main base 8 to the sub-base 6 can be 3 times or more at the frequency f1. In that case, when the vibration direction of the sub-base 6 defines a phase angle of approximately 180 degrees with respect to the direction of the residual mass eccentricity, the amplitude of the vibration can be increased. The increase in the amplitude of the vibration means that the distance between the center of rotation P0 and the whirling center P1 increases in FIG. 5. Then, the moving force R acting on the balancing members 17 increases, and therefore, the mass unbalance can be corrected by the balancing members 17 more effectively. In addition, the transmissibility of the vibration from the main base 8 to the sub-base 6 decreases in the vibration damping range, and the vibration can be dammed to a greater degree at the rotational frequency fm. As a result, the vibration damping effects achieved by the disk drive can be enhanced. Among other things, a silicone rubber material particularly excels in temperature characteristic, and causes little variation in natural frequency even at a high or low temperature. Thanks to this stabilized frequency characteristic, constant vibration damping performance is achievable even if the ambient temperature changes.

Furthermore, if the second elastic members 9 are made of a natural rubber or silicone rubber material, then the transmissibility of the vibration from the sub-base 8 to the dynamic vibration absorber 10 can be three times or more at the frequency f2. In that case, the vibration at a rotational frequency fm that is close to the natural frequency f2 can have increased amplitude. Thus, the vibration damping effects achieved by the disk drive can also be enhanced just as described above.

Furthermore, if the position of the center of mass 10G of the dynamic vibration absorber 10 is substantially aligned with a plane that is parallel to the disk plane and that is located at the center of the thickness, then the mechanical vibration can be damped in the direction parallel to the disk plane. In addition, it is also possible to minimize the generation of the vibration in the direction vertical to the disk plane even more effectively.

In the preferred embodiment described above, the natural frequencies f1 of the sub-base 6 in the directions that are parallel to the base plane are supposed to be substantially equal to each other within the base plane. However, the natural frequencies f1 may sometimes be different from each other in two intersecting axial directions within the base plane. In that case, the natural frequency f1 of the sub-base 6 in any arbitrary direction within the base plane preferably satisfies the relationship described above with the rotational frequency fm. Furthermore, in the preferred embodiment described above, the natural frequencies f2 of the dynamic vibration absorber 10 in the directions that are parallel to the base plane are also supposed to be substantially equal to each other within the base plane. However, the natural frequency f2 of the dynamic vibration absorber 10 in any arbitrary direction within the base plane preferably satisfies the relationship described above with the rotational frequency fm.

Embodiment 2

Figure 6:
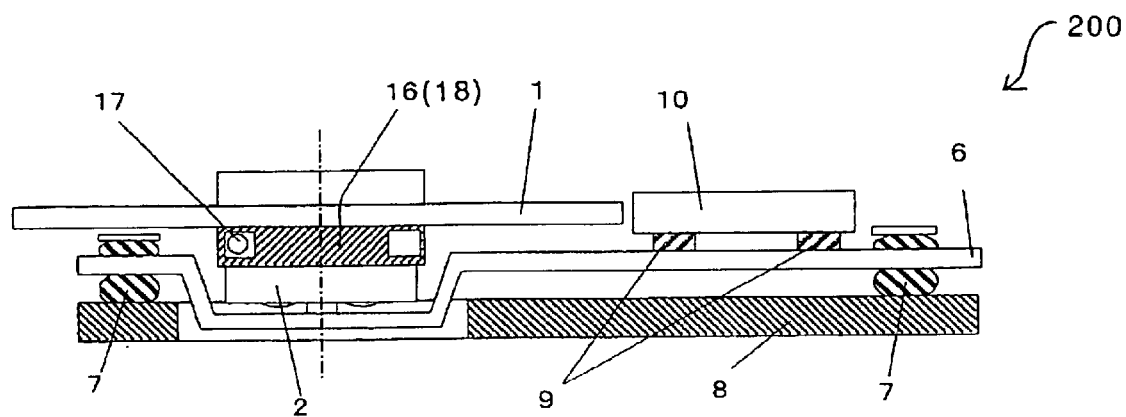
FIG. 6 is a cross-sectional view illustrating a configuration for a disk drive according to a second embodiment of the present invention.

FIG. 6 illustrates a configuration for a disk drive 200 according to a second embodiment. This disk drive 200 is different from the disk drive 100 of the first embodiment in that the auto-balancer 16 forms an integral part of the spindle motor 2. The auto-balancer 16 also serves as the turntable 18 of the disk drive 100.

Such a disk drive 200 also operates in the same way as the disk drive 100 of the first embodiment. Accordingly, by appropriately defining the relationship between the rotational frequency fm of the disk and the natural frequency f1 of the sub-base 6 and the relationship between the rotational frequency fm of the disk and the natural frequency f2 of the dynamic vibration absorber 10, the auto-balancer 16 and the dynamic vibration absorber 10 can also function in such a manner as to reduce the vibration that is generated during the rotation of the disk.

Also, in the disk drive 200, the distance (i.e., the level difference) between the center of mass of the balancing members 17 and that of the sub-base 6 is shortened as compared to the disk drive 100, and the generation of a couple (i.e., a moment force) is reduced. Accordingly, it is possible to minimize the increase in vibration components in the direction vertical to the disk plane due to the vibration that has been generated parallelly to the disk plane. As a result, the vibration of the disk drive can be further reduced.

Embodiment 3

Figure 7:
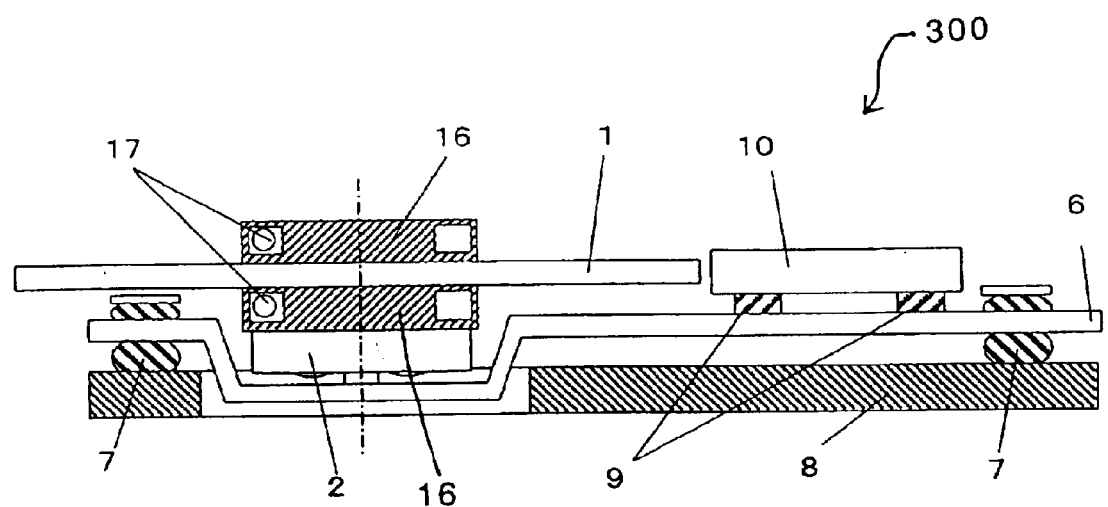
FIG. 7 is a cross-sectional view illustrating a configuration for a disk drive according to a third embodiment of the present invention.

FIG. 7 illustrates a configuration for a disk drive 300 according o a third embodiment. This disk drive 300 is different from the disk drive 100 of the first embodiment in that two auto-balancers 16 are provided on both sides of the disk 1 to sandwich e disk 1 between them. One of these two auto-balancers 16 that is provided under the disk 1 forms an integral part of the spindle motor 2 and also functions as the turntable 18 of the disk drive 100.

Such a disk drive 300 also operates in the same way as the disk drive 100 of the first embodiment. Accordingly, by appropriately defining the relationship between the rotational frequency fm of the disk and the natural frequency f1 of the sub-base 6 and the relationship between the rotational frequency fm of the disk and the natural frequency f2 of the dynamic vibration absorber 10, the auto-balancers 16 and the dynamic vibration absorber 10 can also function in such a manner as to reduce the vibration that is generated during the rotation of the disk.

Furthermore, in the disk drive 300, the auto-balancers 16 are provided on both sides of the disk 1. Accordingly, even if the size of each auto-balancer 16 is reduced, the desired vibration minimization effects are still achievable. Such a configuration is particularly effectively applicable for use in a situation where it is difficult to allow a wide space for the auto-balancer 16 in a disk drive of a relatively small size.

Embodiment 4

Figure 8A:
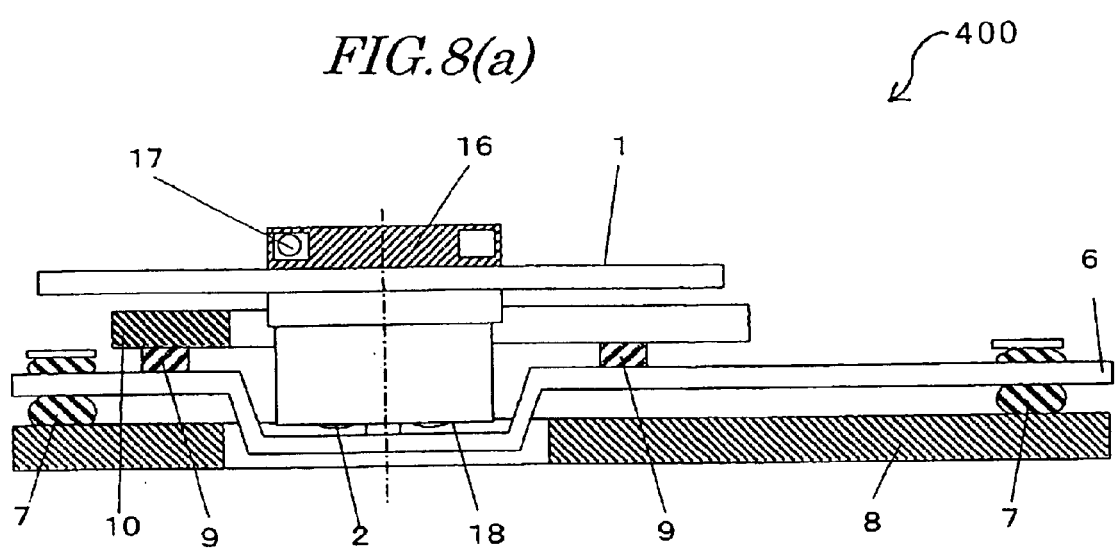
Figure 8B:
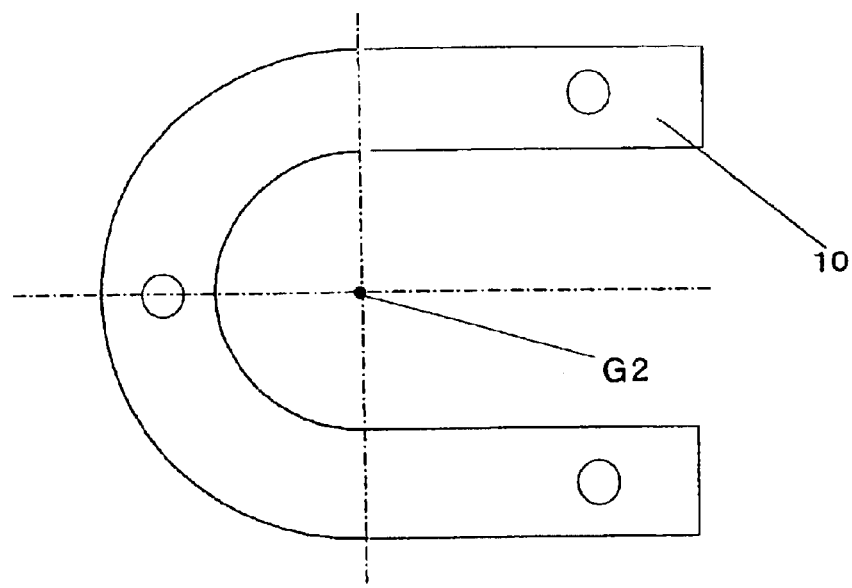

FIG. 8(*a*) is a cross-sectional view illustrating a configuration for a disk drive 400 according to a fourth embodiment, and FIG. 8(b) is plan view of a dynamic vibration absorber 10 included in the disk drive 400. This disk drive 400 is different from the disk drive 100 of the first embodiment in that the dynamic vibration absorber 10 is provided between the disk 1 and the sub-base 6. The dynamic vibration absorber 10 may have a U-shape as shown in FIG. 8(b), for example. Then, the dynamic vibration absorber 10 neither contacts with the spindle motor 2 nor interferes with the write or read operation to be performed by the head.

Also, if the U-shaped dynamic vibration absorber 10 such as that shown in FIG. 8(b) is used, then the center of mass G2 thereof can be substantially matched with the rotation center axis P0 of the auto-balancer 16. Then, the position of the whirling center of the dynamic vibration absorber 10 comes closer to the position of the whirling center of the sub-base 6 and the respective members to be mounted thereon. Accordingly, a couple, which is generated when the whirling centers of two systems that make the whirling motions shift from each other in the direction parallel to the disk plane, can be reduced. As a result, the vibration that is generated in the sub-base 6 can be reduced.

In this embodiment, the dynamic vibration absorber 10 is disposed between the disk 1 and the sub-base 6. Thus, the center of mass G2 of the dynamic vibration absorber 10 can be easily brought closer to the center of rotation P0. Accordingly, a couple, which is generated when two whirling centers shift from each other in the direction vertical to the disk plane, can also be reduced. Consequently, the vibration that is generated in the sub-base 6 can be reduced.

Embodiment 5

Figure 9:
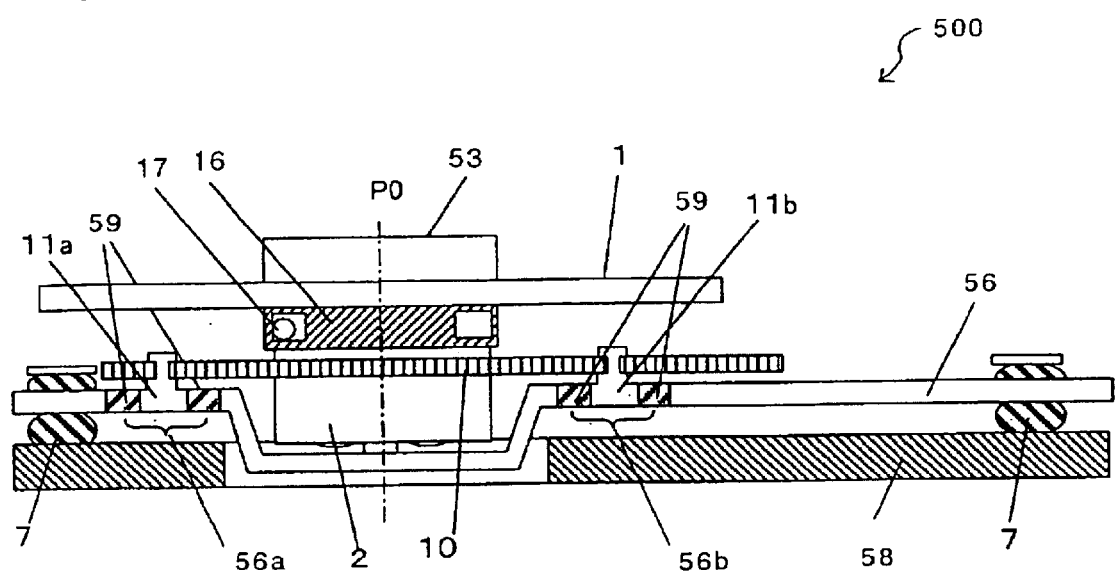
FIG. 9 is a cross-sectional view illustrating a configuration for a disk drive according to a fifth embodiment of the present invention.

FIG. 9 is a cross-sectional view of a disk drive 500 according to a fifth embodiment. In the disk drive 500, the auto-balancer 16 is disposed under the disk 1 and the disk 1 is sandwiched between the auto-balancer 16, which is secured to the shaft of the spindle motor 2, and a clamper 53.

Also, the spindle motor 2 is secured to a base 56 (corresponding to the sub-base 6) that is made of a resin material. The base 56 is secured to a casing 58 (corresponding to the main base 8) by way of the first elastic members 7. The hardness and the shape of the first elastic members 7 are defined so that the natural frequency f1, at which the amplitude of the frequency transmission characteristic representing the vibration to be transmitted from the casing 58 to the base 56 is maximized, is sufficiently lower than the principal rotational frequency fm of the spindle motor 2. For example, when the rotational frequency fm=183 Hz (i.e., 11,000 rpm which corresponds to 48× CD playback speed), the natural frequency f1 may be set equal to 35 Hz (i.e., 2,100 rpm).

Next, the configuration of the dynamic vibration absorber 10 according to this embodiment will be described. The base 56 includes a plurality of hole-shaped portions 56a and 56b. Multiple fixing members 11, which are made of a resin material, are inserted to the centers of the hole-shaped portions 56a and 56b, respectively. The inner wall of each of these hole-shaped portions 56a and 56b and the fixing member 11 are secured to each other via a second elastic member 59 that is provided in the gap between them. They may be secured to each other by either integral resin molding or adhesion. The integral molding using the second elastic embers 59 may be carried out by a known manufacturing processing technique such as injection molding. The dynamic vibration absorber 10 is further secured to, and supported by, the fixing members 11.

Figure 10:
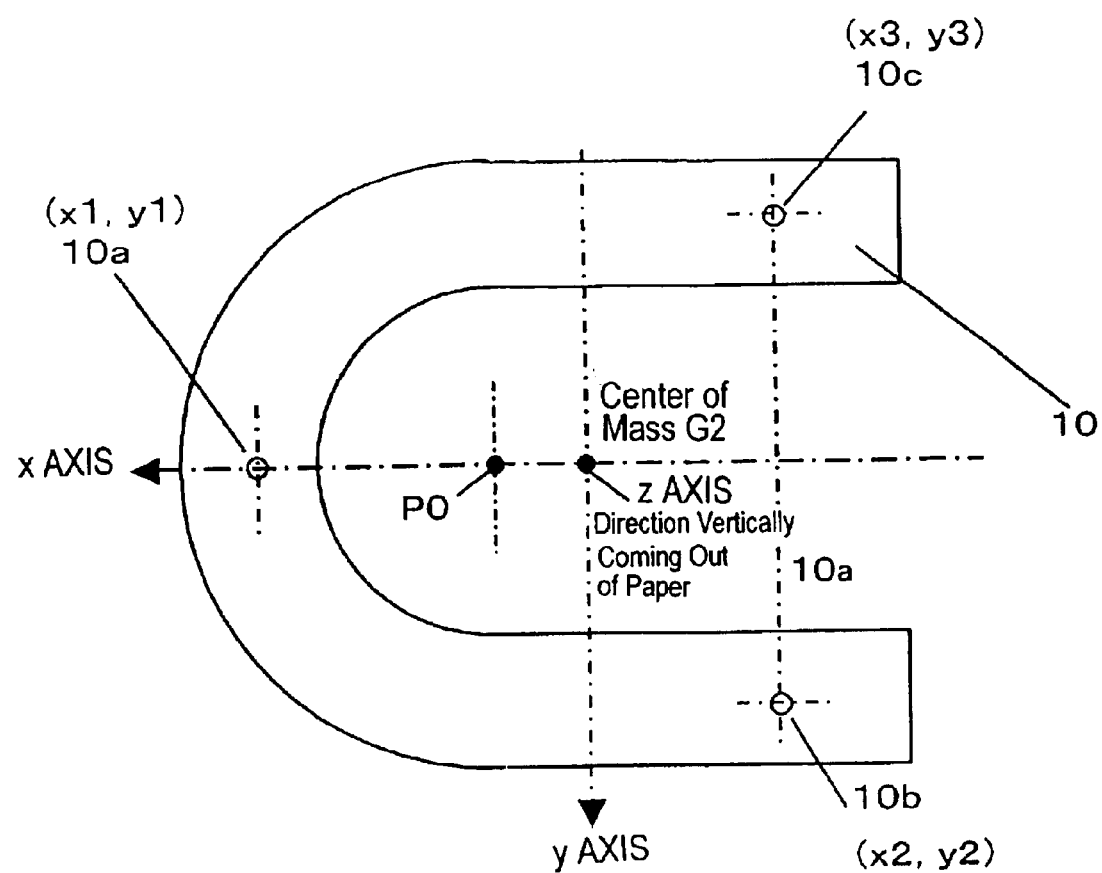
FIG. 10 is a plan view illustrating the dynamic vibration absorber of the disk drive according to the fifth embodiment of the present invention.

Hereinafter, it will be described with reference to FIGS. 10, 11(a) and 11(b) how to support and secure the dynamic vibration absorber 10. FIG. 10 is a plan view illustrating the dynamic vibration absorber 10 according to this fifth embodiment. FIGS. 11(a) and 11(b) are cross-sectional views illustrating how the dynamic vibration absorber 10 of this fifth embodiment may be supported and secured. As shown in FIG. 10, the dynamic vibration absorber 10 is a flat plate having a horseshoe shape (or a U-shape) and is disposed so as to surround the rotation axis P0 of the spindle motor 2. Suppose the center of mass G2 of the dynamic vibration absorber 10 is the origin and three axes of coordinates are defined in the directions of three principal axes of inertia. As shown in FIG. 10, the x and y axes are defined by the symmetry of the horseshoe shape, while the z axis is defined as a direction that comes out of the paper vertically.

The dynamic vibration absorber 10 includes three holes 10a, 10b and 10c, which have coordinates (x1, y1), (x2, y2) and (x3, y3), respectively. These coordinates (x1, y1), (x2, y2) and (x3, y3) are defined so that the median point of the triangle that is defined by these three holes 10a, 10b and 10c matches with the center of mass G2 of the dynamic vibration absorber 10. That is to say, the holes 10a, 10b and 10c are provided at such positions as satisfying the following Equations (1):

$$\frac{x_1 + x_2 + x_3}{3} = 0 \text{ and } \frac{y_1 + y_2 + y_3}{3} = 0 \tag{1}$$

Hereinafter, it will be described how to fit the fixing members 11 with the holes 10a, 10b and 10c. As shown in FIG. 11(a), the fixing member 11 has been molded integrally with the base 56 by way of the elastic member 59 and the bottom of the fixing member 11 is supported by a supporting stage 12. The fixing member 11 includes a protruding portion 11a which is inserted into the hole 10a of the dynamic vibration absorber 10.

Next, by pressing a die 13, which can thermally mold the protruding portion 11a into a rivet shape, against the protruding portion 11a in the state shown in FIG. 11(a), the protruding portion 11a is crushed and molded into a horizontally expanded protrusion 11b as own in FIG. 11(b). In this case, the supporting stage 12 supports the fixing member 11 thereon so that the elastic member 59 is not bent by the pressing force that is received from the die 13. In this manner, the dynamic vibration absorber 10 is connected to the base 56 by way of the elastic members 59.

Figure 12:
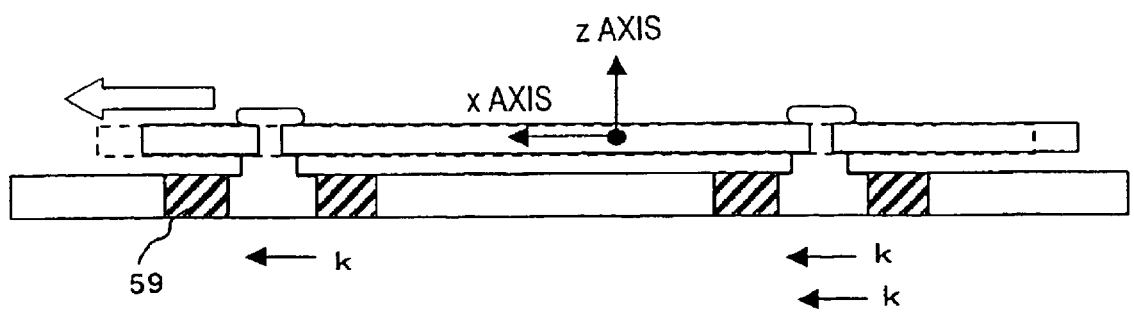
FIG. 12 is a side view illustrating a mode in which the dynamic vibration absorber makes a translational motion in an x-axis direction in the disk drive according to the fifth embodiment of the present invention.
Figure 13:
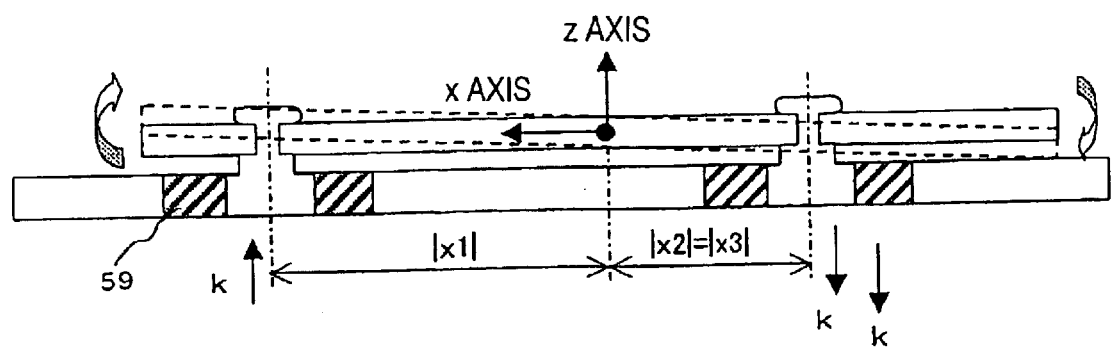
FIG. 13 is a side view illustrating the rotational motion of the dynamic vibration absorber around a y-axis in the disk drive according to the fifth embodiment of the present invention.

Next, it will be described with reference to FIGS. 12 and 13 how the vibration mode and the natural frequency of the dynamic vibration absorber 10 are defined. The dynamic vibration absorber 10 shown in FIG. 10 has six vibration modes. First of all, there are three modes in which the center of mass of the dynamic vibration absorber 10 makes a translational motion along the three axes of coordinates (i.e., in the x-, y- and z-axis directions, respectively). FIG. 12 is a cross-sectional view illustrating the translational mode of the dynamic vibration absorber 10 in an x-axis direction according to this embodiment. In FIG. 12, supposing the spring constant of each elastic member 59 is k in the x-axis direction and the mass of the dynamic vibration absorber 10 is m, the translational mode natural frequency fh thereof is given by the following Equation(2):

$$f_h = \frac{1}{2\pi}\sqrt{\frac{3k}{m}} \tag{2}$$

As for the translational mode in the y-axis direction, the natural frequency fh may also be obtained as in the x-axis direction. For example, if the rotational frequency fm of the spindle motor is 183 Hz, the natural frequency fh is defined to be several tens Hz higher than the rotational frequency fm, e.g., the natural frequency fh=220 Hz. It will be described in further detail later how high the natural frequency should be.

It should be noted that to define fh at the desired natural frequency, the spring constant k may be adjusted by selecting appropriate hardness and shape for the second elastic members 59.

Also, the translational mode natural frequency in the z-axis direction may be approximately equal to, or higher than, the rotational frequency fm.

The other three types of vibration modes are modes in which the dynamic vibration absorber makes a rotational motion around its center of mass (i.e., modes in which the dynamic vibration absorber is displaced angularly with respect to the base plane). Specifically, there are three types of modes in which the dynamic vibration absorber rotates around the x, y and z axes, respectively. FIG. 13 is a cross-sectional view illustrating the rotational motion of the dynamic vibration absorber 10 around the y axis according to this embodiment. In FIG. 13, the spring constant of each elastic member 59 is supposed to be k in the z-axis direction and the moment of inertia of the dynamic vibration absorber 10 around the y axis is supposed to be Iyy.

Supposing the torsion spring constant around the y axis is Ky, the natural frequency of the dynamic vibration absorber in the y-axis rotational mode (i.e., the pitching mode natural frequency fp) is given by the following Equation (3):

$$f_p = \frac{1}{2\pi} \sqrt{\frac{K_y}{I_{yy}}} \quad (3)$$

In this embodiment, the pitching mode natural frequency fp is defined to be approximately equal to the rotational frequency. That is to say, fm=fp=183 Hz. The reasons why the natural frequency is defined at this value will be described later. The torsion spring constant Ky around the y axis is given by the following Equation (4):

$$K_y = k|x_1| + k|x_2| + k|x_3| \quad (4)$$

In this case, noting that the relationship |x2|=|x3|=2 |x1| is satisfied according to the Equation (1) described above, it can be seen that the natural frequency fp of the dynamic vibration absorber in the y-axis rotational mode can be controlled by adjusting |x1|. That is to say, the shorter the supporting distance |x1|, |x2| or |x3| from the center of mass G2 of the dynamic vibration absorber 10 to the elastic member 59 that supports the dynamic vibration absorber 10, the lower the natural frequency fp. On the other hand, the longer this supporting distance, the higher the natural frequency fp.

The natural frequency fp may also be controlled by increasing or decreasing the moment of inertia Iyy through the extension or shortening of the dynamic vibration absorber 10 in the x-axis direction.

The method of defining the natural frequency in the y-axis rotational mode has been described above. As for the x-axis rotational mode, fp may be defined similarly by adjusting either the supporting distance |y1|, |y2| or |y3| or the moment of inertia Ixx. Furthermore, the natural frequency in the z-axis rotational mode may be approximately equal to, or higher than, the rotational frequency fm.

In summary, the natural frequencies in the respective vibration modes may be defined as follows:

f1=35 Hz (i.e., 2,100 rpm): a translational mode natural frequency of the base 56 that makes a translational motion with respect to the casing 58 by way of the first elastic members 7;

fm=183 Hz (i.e., 11,000 rpm): the principal rotational frequency of the spindle motor 2 (and disk);

fp=183 Hz: the pitching mode natural frequency of the dynamic vibration absorber 10 (i.e., the natural frequency thereof in the x- or y-axis rotational mode); and fh=220 Hz: the translational mode natural frequency (i.e., the natural frequency thereof in the x- or y-axis translational mode).

The natural frequency in the z-axis translational mode and the natural frequency in the z-axis rotational mode should be approximately equal to, or higher than, the rotational frequency fm but are not particularly limited in the other respects.

Figure 14:
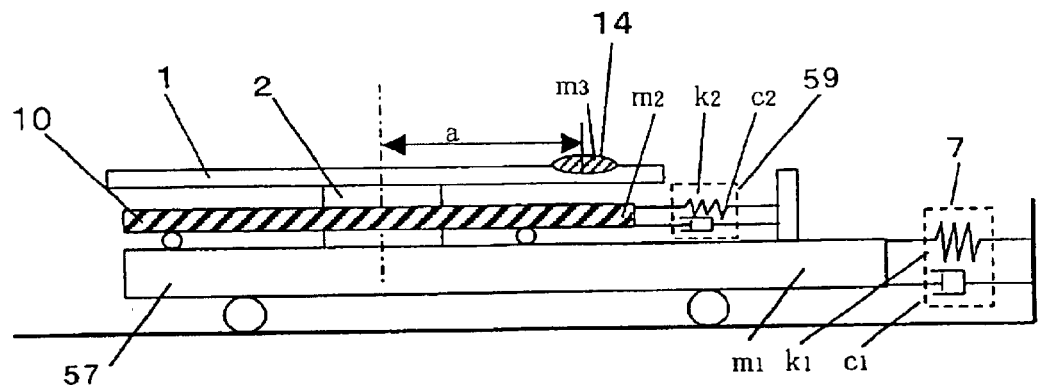
FIG. 14 illustrates a dynamic model of the disk drive according to the fifth embodiment of the present invention.
Figure 15:
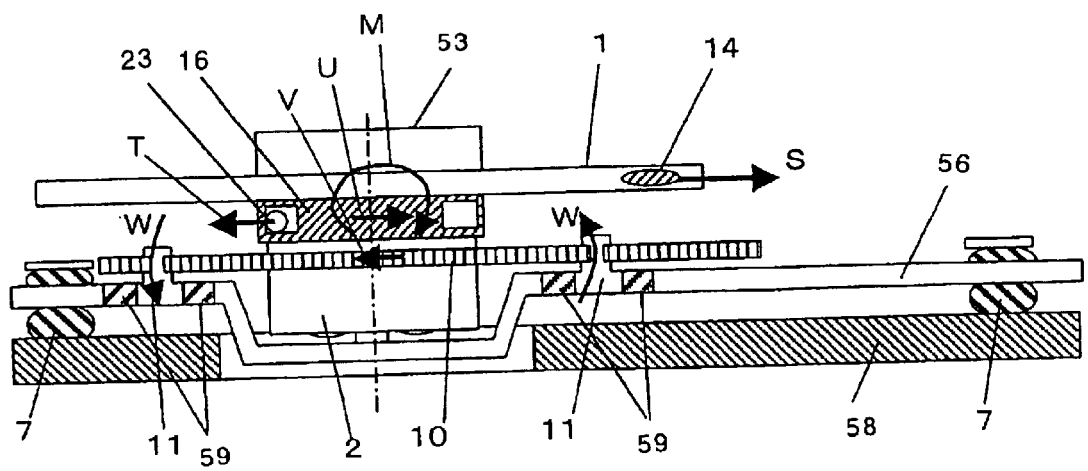
FIG. 15 is a side view showing various forces applied to the disk drive according to the fifth embodiment of the present invention.

Hereinafter, it will be described with reference to FIGS. 14 and 15 how the disk drive having such a configuration operates.

First, the motion of the disk drive in a direction parallel to the disk plane will be described by using a dynamic model. FIG. 14 illustrates a dynamic model of the dynamic vibration absorber 10 according to the first embodiment of the present invention.

The base 56 is supported on the casing 58 by way of the first elastic member 7 that is defined by a spring constant k1 and a viscous damping factor c1. The total mass of the disk 1, spindle motor 2 and base 56 is m1. The dynamic vibration absorber 10 has mass m2 and is supported on the base 56 by way of a second elastic member 59 that is defined by spring constant k2 and a viscous damping factor c2. Also, the eccentric center of mass 14 of the disk 1 having mass m3 exists at a position that is distant from the center of rotation P0 by a radius a. According to this dynamic model, supposing the displacements of the masses m1, m2 and m3 in the x-axis direction are represented by x1, x2 and x3, respectively, the following equations of motion (5.1) through (5.3) are obtained:

$$m_1 \ddot{x}_1 = -c_1 \dot{x}_1 - k_1 x_1 + c_2(\dot{x}_2 - \dot{x}_1) + k_2(x_2 - x_1) - m_3 \ddot{x}_3 \quad (5.1)$$

$$m_2 \ddot{x}_2 = -c_2(\dot{x}_2 - \dot{x}_1) - k_2(x_2 - x_1) \quad (5.2)$$

$$x_3 - x_1 = \alpha \cos(\omega t) \quad (5.3)$$

In Equation (5.3), ω represents the number of revolutions of the spindle motor 2 (unit: [rad/sec]). Also, in Equations (5.1) and (5.2), the dot "•" on the top of some letters represents differentiation. As represented by the following Equation (7), the stationary solution of x1 may be derived from Equations (5.1) through (5.3) by a Laplace transform that uses G (s) given by the following Equation (6):

$$G(s) = \frac{m_3 a \omega^2}{D_1 + N_2 - \frac{N_2^2}{D_2}} \text{ただし} \quad (6)$$

$$D_1 = m_1 s^2 + c_1 s + k_1$$
$$D_2 = m_2 s^2 + c_2 s + k_2$$
$$N_2 = c_2 s + k_2$$

$$x_1(t) = |G(s)| \cos(\omega t + \angle(G(s))) \quad (7)$$

where s=jω and j is an imaginary unit. In Equation (7), |G(s)| represents the amplitude of the base 56 in the x-axis direction and ∠(G(s)) represents the phase of the displace exit of the base 56 with respect to the displacement of the eccentric center of mass 14.

Next, the relationship between the vibration and the phase of the base 56 as derived from Equation (7) will be described with reference to FIGS. 17(a) and 17(b). FIGS. 17(a) and 17(b) are graphs showing the relationships between the rotational frequency of the spindle motor 2 and the vibration of the base 56 according to this embodiment. In FIGS. 17(a) and 17(b), the abscissa represents the rotational frequency of the spindle motor 2. Specifically, FIG. 17(a) shows the vibration in the x- or y-axis direction while FIG. 17(b) shows the vibration in the z- axis direction.

In FIG. 17(a), the graph 60 represents the vibration that is generated in the base 56 in the x-axis direction when only the dynamic vibration absorber functions and plots the values of $\omega^2|G(s)|$. The graph 62 represents the whirling phase of the base 56 with respect to the eccentric center of mass and plots the values of $\angle(G(s))$. The principal rotational frequency fm of the spindle motor is 183 Hz, at which the whirling phase has an angle of about −174 degrees. If the shift from −180 degrees is identified by $\beta1$, $\beta1=6$ degrees. Also, the whirling phase at the translational mode natural frequency fh=220 Hz is about −124 degrees. If the shift from −180 degrees is identified by $\beta2$ in a similar manner, $\beta2=56$ degrees. And the graph 61 represents the vibration that is generated in the base 56 when the dynamic vibration absorber and the auto-balancer are combined with each other.

As described above, if the rotational frequency fm of the spindle motor 2 is higher than the natural frequency f1 to a certain degree, the whirling phase has an angle of around −180 degrees. However, the closer to the natural frequency fh the rotational frequency fm gets, the greater the shift of the whirling phase from −180 degrees. The shift $\beta$ of the whirling phase from −180 degrees is created by the function of the dynamic vibration absorber 10. Accordingly, as the rotational frequency fm gets closer to the translational mode natural frequency fh, the phase shift $\beta$ increases.

Next, it will be described with reference to FIG. 5 again how the auto-balancer 16 operates when the dynamic vibration absorber 10 is provided. As described above upon receiving the centrifugal force q and the drag force N, the balancing members 17 move to the direction indicated by the arrow R to gather toward a position that is substantially opposite to the whirling center P1 with respect to the center P0. As can be seen from FIG. 5, if the distance from the rotation axis P0 to the whirling center P1 is regarded as a whirling radius, then the resultant force R is proportional to the length of the whirling radius. Accordingly, if the weight of the base 56 is reduced by making the base 56 of a resin material, then the whirling radius increases. In that case, the resultant force R likely exceeds the frictional force that is received from the hollow ring portion 23 and the balancing members 17 can be moved to an appropriate position.

Furthermore, in this embodiment, if the disk drive is operated in such a manner that the phase angle $\gamma$ falls within the range of 120 degrees to 180 degrees as described above, then the magnitude of the resultant force U will also be smaller than that of the unbalanced force S. Also, the vibration of the base 56 is minimized by the function of the dynamic vibration absorber 10. The vibration that is generated in the base 56 when the dynamic vibration absorber 10 and the auto-balancer 16 are combined in this manner is represented by the graph 61 shown in FIG. 17(a). Comparing the graphs 61 and 60 with each other, it can be seen that the relationship between the magnitudes of vibrations generated reverses in the vicinity of the translational mode natural frequency fh of 220 Hz.

In this case, $\gamma \neq 180-\beta=|\angle(G(s))|$ as can be seen from FIG. 5. Paying attention to this relationship, the phase angle $\gamma$ is selectable by controlling $\angle(G(s))$. If the translational mode natural frequency fh is defined to be 1.05 times or less as high as the rotational frequency fm of the disk 1, then the vibration phase of the base 56 has a phase angle $\gamma$ of 120 degrees or less with respect to the direction of S and the resultant force U becomes greater than S. On the other hand, if the translational mode natural frequency fh is defined to be twice or more as high as the rotational frequency fm of the disk 1, then the vibration absorption effects achieved by the dynamic vibration absorber 10 diminish. in that case, the curves 60 and 61 are similar to each other and the vibration cannot be reduced effectively. In view of these considerations, the translational mode natural frequency fh of the dynamic vibration absorber 10 is preferably defined to be 1.05 to 2 times as high as, and most efficiently about 1.1 times as high as, the principal rotational frequency fm of the disk 1.

Next, the relationship between the forces applied in the disk drive of this embodiment will be described with reference to FIG. 15.

If the translational mode natural frequency fh of the dynamic vibration absorber 10 is defined to be 1.05 to 2 times as high as the principal rotational frequency fm of the disk 1 as described above, then the residual unbalanced force U, which could not be eliminated even by the use of the auto-balancer, and the force V that acts horizontally onto the dynamic vibration absorber 10 are applied in substantially opposite directions. In that case, these forces U and V cancel each other, thus minimizing the vibration of the base 56.

However, it is impossible to dispose both the balancing members 17 and the disk 1 on the same plane. Accordingly, the force S that acts on the eccentric center of mass of the disk 1 and the force T that acts on the auto-balancer 16 are applied at mutually different vertical levels. That is to say, a moment M is generated by the forces S and T. Then, if the dynamic vibration absorber 10 operates in a pitching mode with respect to the moment M generated, the base 56 receives a counter-moment W. In this case, the pitching mode operation of the dynamic vibration absorber 10 is independent of the translational motion, and neither changes the whirling phase of the base 56 nor affects the movement of the balancing members 17. Accordingly, the pitching mode natural frequency fp of the dynamic vibration absorber 10 is preferably defined freely so that the moment M can be minimized by the dynamic vibration absorber 10 most effectively.

More specifically, if the pitching mode natural frequency fp of the dynamic vibration absorber 10 is substantially equalized with the principal rotational frequency fm of the spindle motor 2, then the vibration of the base 56 in the pitching mode can be reduced effectively. This effect will be described with reference to FIG. 17(b).

In FIG. 17(b), the graph 63 represents the vibration that is generated in the base 6 in the z-axis direction when only the dynamic vibration absorber functions. The graph 64 represents the vibration that is generated in the base 56 in the z-axis direction when the dynamic vibration absorber and the auto-balancer are combined with each other. And the graph 65 represents the phase of the vibration that is generated in the base 56 in the z-axis direction with respect to the eccentric center of mass. It should be noted that the vibration generated in the z-axis direction increases proportionally to the distance from the spindle motor 2.

Accordingly, the results that were calculated at a paint of the base 56 are plotted in FIG. 17(*b*).

As can be seen from the graph 65, the pitching mode phase of the sub-base 6 with respect to the eccentric center of mass is changed by the function of the dynamic vibration absorber 10 in the vicinity of the natural frequency fp. However, since β1=6 degrees according to the phase relationship in the translational mode, the balancing members 17 move to a position that is substantially opposite to the eccentric center of mass of the disk 1, thereby correcting the centrifugal force caused by the mass eccentricity. The graphs 64 and 63 do not cross each other in the vicinity of the natural frequency fp and the vibrations represented by these graphs 63 and 64 reach their local minimums in the vicinity of the natural frequency fp. Thus, it can be confirmed that the dynamic vibration absorber 10 does not decrease the correction function of the auto-balancer 16.

If the angular displacement mode (i.e., pitching mode) vibration f the base 56 is effectively minimized by the dynamic vibration absorber 10 in this manner, then the vibration in the z-axis direction, which interferes with the movement of the balancing members 17 can be reduced. Thus, the auto-balancer can achieve stabilized correction effects. It should be not that even by reducing the weight of the base 56 by making the base 56 of a resin material, the whirling radius can also be increased and the correction effects achieved by the auto-balancer can be enhanced. Also, if the base 56 is made of a resin material, the overall weight of the disk drive can also be reduced.

These effects are achievable by defining the pitching mode natural frequency fp and translational mode natural frequency fh of the dynamic vibration absorber 10 at mutually different values. According to this embodiment, the natural frequency fp can be decreased by shortening the supporting distance from the center of mass G2 of the dynamic vibration absorber 10 to the elastic member 59 that supports the dynamic vibration absorber thereon and can be increased by extending the supporting distance. Then, it is easy to define the translational mode natural frequency fh of the dynamic vibration absorber at an appropriate value that is higher than the rotational frequency fm by adjusting the spring constant of the elastic member 59 and set the natural frequency fp approximately equal to the rotational frequency fm at the same time.

It should be noted that the natural frequency fp may also be defined easily even by selecting an appropriate shape for the dynamic vibration absorber 10 and by adjusting the moment of inertia. As described above, the disk drive of this embodiment can define the natural frequency fp by any of various methods, and can be designed with an increased degree of flexibility.

As also described above, according to this embodiment, if the hole of the base 56 is filled with the elastic member 59 that supports the dynamic vibration absorber 10 by adhering the elastic member 59 to the hole through an integral molding process, the number of assembling process steps can be reduced. Furthermore, if the dynamic vibration absorber 10 is pressed and fixed by heating and crushing the protruding portion of the fixing member 11, the number of assembling process steps can also be reduced.

Embodiment 6

Figure 16:
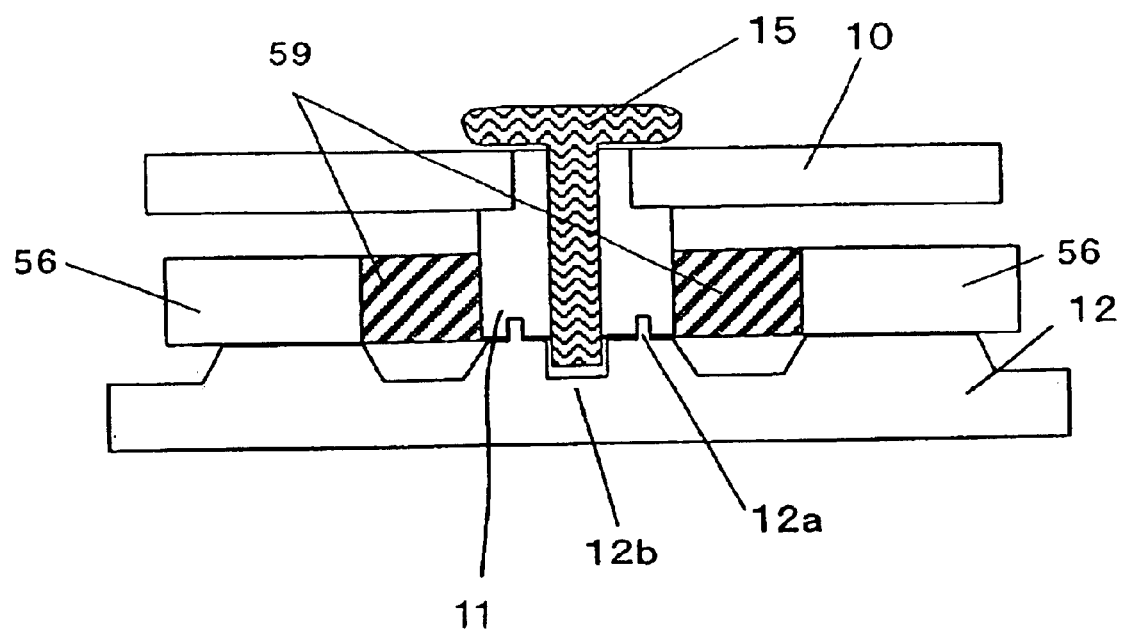
FIG. 16 is a cross-sectional view illustrating how the dynamic vibration absorber may be supported and fixed in a disk drive according to a sixth embodiment of the present invention.

Hereinafter, it will be described with reference to FIG. 16 how to support and fix the dynamic vibration absorber 10 in a disk drive according to a sixth embodiment. The method of supporting and fixing the dynamic vibration absorber 10 according to this embodiment is different from the method of the fifth embodiment in the following respects.

Specifically, in the fifth embodiment described above, the protruding portion of the fixing member 11 is pressed and fixed by heating and crushing it as shown in FIG. 11(*b*). In this embodiment on the other hand, the dynamic vibration absorber 10 is fixed by a screw 15 as shown in FIG. 16.

According to the method of this embodiment, however, the fixing member 11 might rotate due to a torque that is generated when the screw is inserted. In this case, the elastic member 59 is interposed between the fixing member 11 and the base 56. Accordingly, if an excessive torque was applied, the joint between the elastic member 59 and the base 56 or between the elastic member 59 and the fixing member 11 might be loosened. To avoid this problem, according to this embodiment, a protrusion 12*a* is provided for the supporting stage 12 to prevent the fixing member 11 from rotating, and is engaged with a rotation stopping notch that is provided for the fixing member 11. It should be noted that the concave portion 12*b* of the supporting stage 12 is provided to receive the protrusion of the screw 15.

The disk drive of the sixth embodiment having such a configuration operates just like the counterpart of the fifth embodiment described above, and the description thereof will be omitted herein. The screw fixing method needs a greater number of members than the press-fixing method but is advantageous in that conventional assembling equipment can be used.

INDUSTRIAL APPLICABILITY

The disk drive according to the present invention can minimize the vibration to be generated during the rotation of a disk, thereby performing a write or read operation with good stability and at a high data transfer rate.

What is claimed is:

1. A disk drive comprising: a motor with a rotating portion to rotate a disk thereon; an auto-balancer, which is connected to the rotating portion of the motor and which is able to change its center of mass; a base, which is secured to the motor and which is connected to an external member by way of a first elastic member; and a dynamic vibration absorber, which is connected to the base by way of a second elastic member, wherein if the disk makes a whirling motion while being rotated by the motor, a relationship between a first natural frequency of a first vibration system, which includes the base, the first elastic member and the external member, as measured parallelly to a base plane and a rotational frequency of the disk and a relationship between a second natural frequency of a second vibration system, which includes the dynamic vibration absorber, the second elastic member and the base, as measured parallelly to the base plane and the rotational frequency of the disk are defined so that a phase angle of 120 degrees to 180 degrees is formed between a direction that is pointed from a whirling center axis toward a center of mass of the disk and a direction that is pointed from the whirling center axis toward the center of mass of the auto-balancer.

2. The disk drive of claim 1, wherein the disk drive rotates the disk at a frequency that is substantially equal to a third natural frequency of the second vibration system as measured vertically to the base plane.

3. The disk drive of claim 1, wherein the first natural frequency is at most $1/\sqrt{2}$ time as high as the rotational frequency of the disk.

4. The disk drive of claim 1, wherein the second natural frequency is 1.05 to 2 times as high as the rotational frequency of the disk.

5. The disk drive of claim 1, wherein the auto-balancer includes a hollow ring member and moving members that are stored inside the hollow ring member so as to be movable therein.

6. The disk drive of claim 1, wherein the auto-balancer is secured to the rotating portion of the motor.

7. The disk drive of claim 1, wherein vibration is transmitted from the external member to the base at a transmissibility of greater than three at the first natural frequency.

8. The disk drive of claim 1, wherein vibration is transmitted from the base to the dynamic vibration absorber at a transmissibility of greater than three at the second natural frequency.

9. The disk drive of claim 1, wherein the first elastic member is made of either a silicone rubber material or a natural rubber material.

10. The disk drive of claim 1, wherein the second elastic member is made of either a silicone rubber material or a natural rubber material.

11. The disk drive of claim 1, wherein the auto-balancer is provided on both sides of the disk.

12. The disk drive of claim 1, wherein the center of mass of the dynamic vibration absorber is located within a plane that is parallel to the disk plane and at is leveled with the center of thickness of the disk.

13. The disk drive of claim 1, wherein the center of mass of the dynamic vibration absorber is located on an axial line that defines the rotation center axis of the disk.

14. The disk drive of claim 1, wherein the dynamic vibration absorber is provided between the disk and the base.

15. A disk drive comprising: a motor with a rotating portion to rotate a disk thereon; an auto-balancer, which is connected to the rotating portion of the motor and which is able to change its center of mass; a base, which is secured to the motor; and a dynamic vibration absorber, which is connected to the base by way of multiple elastic members, wherein a natural frequency of the dynamic vibration absorber in a translational mode in which the absorber makes a translational motion with respect to a base plane of the base is different from a natural frequency of the dynamic vibration absorber in an angular displacement mode in which the absorber is displaced angularly with respect to the base plane of the base.

16. The disk drive of claim 15, wherein the natural frequency in the translational mode is higher than a rotational frequency of the disk, and wherein the natural frequency in the angular displacement mode is substantially equal to the rotational frequency of the disk.

17. The disk drive of claim 15, wherein the natural frequency in the angular displacement mode is defined by adjusting a distance between a center of mass of the dynamic vibration absorber and the multiple elastic members that support the dynamic vibration absorber thereon.

18. The disk drive of claim 15, wherein the natural frequency in the angular displacement mode is defined by adjusting a moment of inertia around the center of mass of the dynamic vibration absorber.

19. The disk drive of claim 15, wherein each of the multiple elastic members is provided between the inner wall of an opening of the base and a convex fixing member, the fixing member being connected to the dynamic vibration absorber and inserted into the opening.

20. The disk drive of claim 19, wherein the convex fixing member extends through the dynamic vibration absorber, and the top of the fixing member that extends through the dynamic vibration absorber is fixed to the dynamic vibration absorber at one end thereof by a press-fixing technique in which the top is heated and crushed.

21. The disk drive of claim 19, wherein the fixing member includes a rotation stopping portion, and the dynamic vibration absorber is screwed to the fixing member.

22. A disk drive comprising: a motor with a rotating portion to rotate a disk thereon; an auto-balancer, which is connected to the rotating portion of the motor and which is able to change its center of mass; a base, which is secured to the motor; and a dynamic vibration absorber, which is connected to the base by way of an elastic member, wherein a natural frequency of the dynamic vibration absorber in a mode in which the absorber makes a translational motion with respect to a base plane of the base is different from a natural frequency of the dynamic vibration absorber in a mode in which the absorber makes a translational motion vertically to the base plane of the base.

23. The disk drive of claim 22, wherein the natural frequency in the mode in which the absorber makes the translational motion with respect to the base plane is higher than a rotational frequency of the disk, and wherein the natural frequency in the mode in which the absorber makes the translational motion vertically to the base plane of the base is substantially equal to the rotational frequency of the disk.

* * * * *

UNITED STATES PATENT AND TRADEMARK OFFICE
CERTIFICATE OF CORRECTION

PATENT NO.         : 6,834,393 B2
APPLICATION NO.    : 10/220868
DATED              : December 21, 2004
INVENTOR(S)        : Kenji Akimaru et al.

It is certified that error appears in the above-identified patent and that said Letters Patent is hereby corrected as shown below:

Title page, item (54) and col. 1, line 1,

The title should read -- DISK DRIVE --;

Column 23, line 24:

The word "at" should read -- that --.

Signed and Sealed this

Thirty-first Day of March, 2009

JOHN DOLL
*Acting Director of the United States Patent and Trademark Office*